(12) United States Patent
Duckworth et al.

(10) Patent No.: US 11,948,161 B2
(45) Date of Patent: *Apr. 2, 2024

(54) SYSTEM AND METHOD FOR PROVIDING DISPOSAL RECOMMENDATION FOR A VEHICLE OWNER

(71) Applicant: Capital One Services, LLC, McLean, VA (US)

(72) Inventors: Staevan Duckworth, The Colony, TX (US); Qiaochu Tang, The Colony, TX (US); Habeeb Hooshmand, Katy, TX (US); Micah Price, Plano, TX (US); Geoffrey Dagley, McKinney, TX (US); Stephen Wylie, Carrollton, TX (US); Jason Hoover, Grapevine, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/670,666

(22) Filed: Feb. 14, 2022

(65) Prior Publication Data

US 2022/0164810 A1    May 26, 2022

Related U.S. Application Data

(63) Continuation of application No. 16/869,858, filed on May 8, 2020, now Pat. No. 11,282,094, which is a
(Continued)

(51) Int. Cl.
*G06Q 30/0201* (2023.01)
*G06Q 10/0637* (2023.01)
(Continued)

(52) U.S. Cl.
CPC ... *G06Q 30/0201* (2013.01); *G06Q 10/06375* (2013.01); *G06Q 10/30* (2013.01); *G06Q 30/016* (2013.01); *G06Q 40/03* (2023.01)

(58) Field of Classification Search
None
See application file for complete search history.

(56) References Cited

U.S. PATENT DOCUMENTS 5,309,139 A    3/1994    Austin
5,570,087 A    10/1996   Lemelson
(Continued)

FOREIGN PATENT DOCUMENTS

WO    WO-2017142536 A1 *    8/2017    ......... G01C 21/3438

OTHER PUBLICATIONS

Si-Yu Shao et al "A Deep Learning Approach for Fault Diagnosis of Induction Motors in Manufacturing", Dec. 2017, Chinese Journal of Mechanical Engineering, pp. 1347-1356 (Year: 2017).*

(Continued)

*Primary Examiner* — Romain Jeanty
(74) *Attorney, Agent, or Firm* — FINNEGAN, HENDERSON, FARABOW, GARRETT & DUNNER, LLP

(57) ABSTRACT

Systems and methods for providing a disposal recommendation for an owned vehicle are provided. The method includes generating a profile for the owned vehicle, the profile including age, mileage, and location of the owned vehicle, receiving monitoring data of the owned vehicle, and receiving sales data for non-owned vehicles corresponding to the profile. The method may further include generating predicted depreciation data of the owned vehicle, based on the sales data and the monitoring data, and providing a recommended disposal time for the owned vehicle, based on the predicted depreciation data.

20 Claims, 14 Drawing Sheets

Related U.S. Application Data continuation of application No. 16/287,350, filed on Feb. 27, 2019, now Pat. No. 10,679,226.

(51) Int. Cl.
*G06Q 10/30* (2023.01)
*G06Q 30/016* (2023.01)
*G06Q 40/03* (2023.01)

(56) References Cited

U.S. PATENT DOCUMENTS

| | | |
|---|---|---|
| 9,286,266 B1 | 3/2016 | Fleck et al. |
| 9,773,251 B2 | 9/2017 | Liu et al. |
| 10,495,544 B1 * | 12/2019 | Billing ................. G08B 21/182 |
| 2008/0154829 A1 | 6/2008 | Dalton |
| 2010/0211511 A1 | 8/2010 | Kawasaki |
| 2010/0274631 A1 | 10/2010 | McFall et al. |
| 2013/0204466 A1 | 8/2013 | Ricci |
| 2015/0298654 A1 * | 10/2015 | Joao ........................ G01S 19/13 701/2 |
| 2015/0348058 A1 | 12/2015 | Liu et al. |
| 2017/0061459 A1 | 3/2017 | Dow et al. |
| 2017/0129426 A1 * | 5/2017 | Smith ................... B60R 16/037 |
| 2018/0025391 A1 * | 1/2018 | Funkhouser ....... G06Q 30/0631 705/26.4 |
| 2018/0082342 A1 | 3/2018 | Cahan et al. |
| 2019/0258263 A1 * | 8/2019 | Wendel ................. B60W 50/14 |
| 2021/0215491 A1 | 7/2021 | Liu et al. |

OTHER PUBLICATIONS

Chad "Fleet Residuals Model Projects Used-Vehicle Values", May 2006, Remarketing, pp. 1-8 (Year: 2006).

David "Vehicle Aquisition and Disposal", Feb. 2010; Vehicle PRoS, pp. 1-19 (Year: 2010).

* cited by examiner

Interface System 150

Interface System 150

Interface System 150

FIG. 19
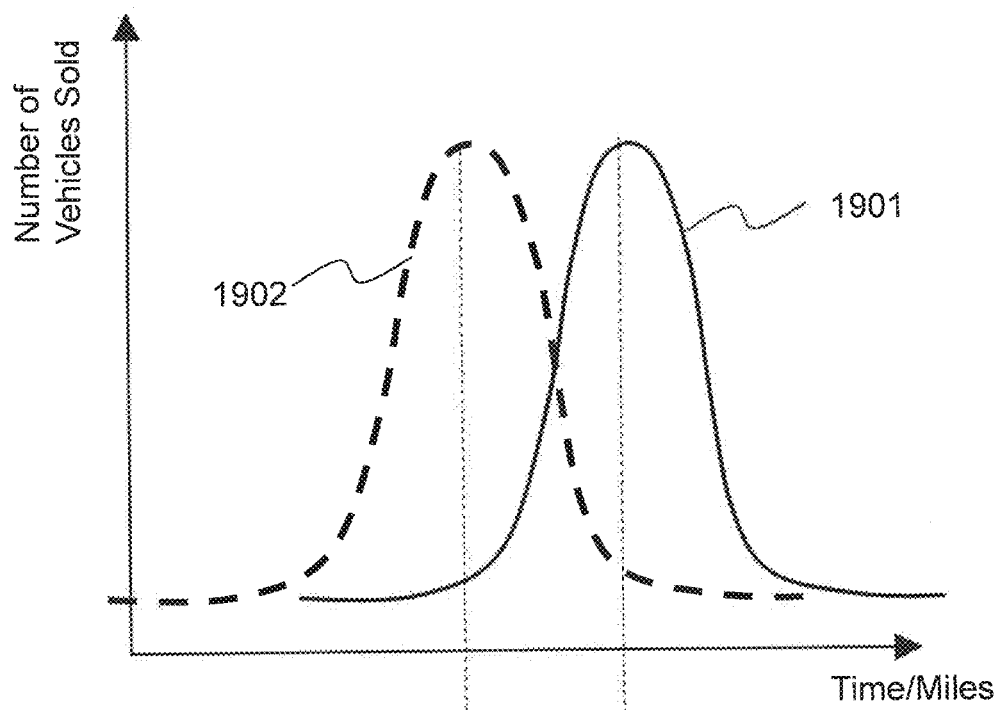
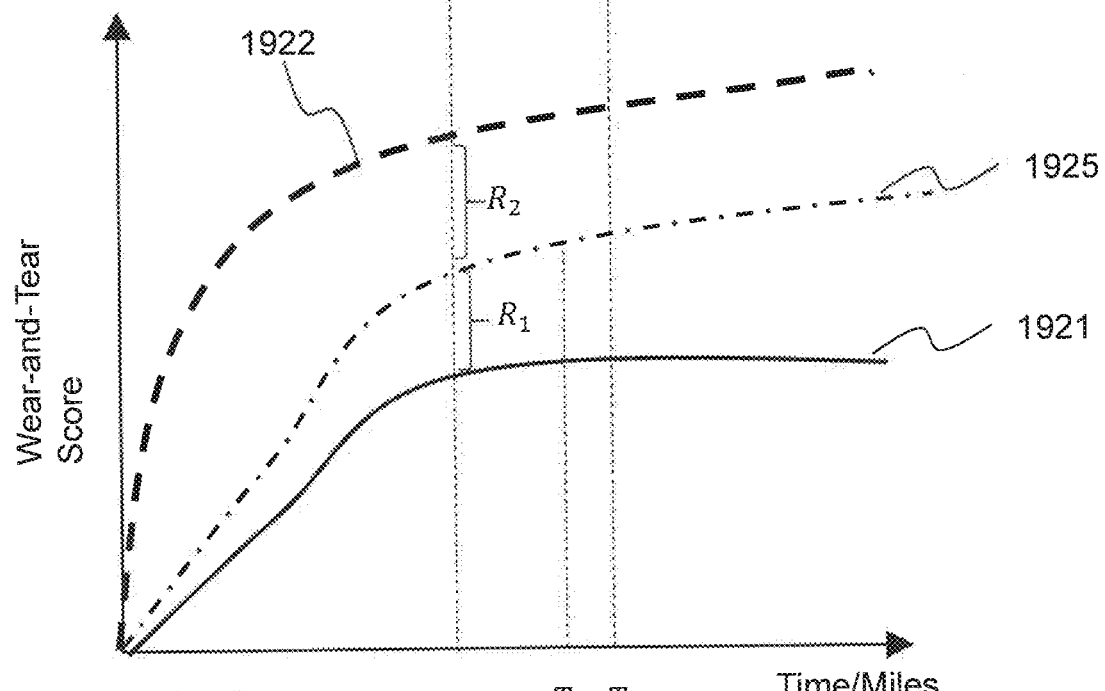

SYSTEM AND METHOD FOR PROVIDING DISPOSAL RECOMMENDATION FOR A VEHICLE OWNER

CROSS REFERENCE TO RELATED APPLICATIONS

This application is a continuation of application Ser. No. 16/869,858, filed May 8, 2020, which is a continuation of U.S. patent application Ser. No. 16/287,350, filed on Feb. 27, 2019. The aforementioned applications are incorporated herein by reference in their entireties.

TECHNICAL FIELD

The present invention generally relates to methods and systems for providing financial recommendations, and, more particularly for providing a recommendation for a disposal time for a user owning a vehicle.

BACKGROUND

Vehicle depreciation is one of the largest costs of owning a vehicle for a user, with the vehicle maintenance costs coming in second. A vehicle depreciates due to wear and tear, as well as people's perception of a vehicle. For example, a user may own a barely used Yugo GV, but depreciation of such vehicle may be significant, due to people's low appreciation of this vehicle.

The current approach for estimating depreciation for a vehicle is usually based on statistical parameters such as the age of the vehicle, mileage of the vehicle and vehicle type, make, model, and trim line. In many cases, however, the vehicles corresponding to the same statistical parameters may be vastly different in their performance and outward appearance resulting in significant variation in a selling price of the vehicles.

Accordingly, there is a need for providing systems and methods that can assist users owning vehicles in determining the value of their vehicles, and in providing a recommendation for when to sell their vehicles. The disclosed system and methods address the problems set forth above as well as other deficiencies in existing systems and methods.

SUMMARY

Disclosed embodiments provide systems and methods for determining the value of a vehicle and for providing a recommendation for when to sell a vehicle.

Consistent with a disclosed embodiment, a method for providing a disposal recommendation for an owned vehicle is provided. The method may comprise generating a profile for the owned vehicle, the profile comprising age, mileage, and location of the owned vehicle, receiving monitoring data of the owned vehicle, and receiving sales data for non-owned vehicles corresponding to the profile. The method may further comprise generating predicted depreciation data of the owned vehicle, based on the sales data and the monitoring data, and providing a recommended disposal time for the owned vehicle, based on the predicted depreciation data.

Consistent with another disclosed embodiment, a method for providing a disposal recommendation for an owned vehicle is provided. The method may comprise generating a profile for the owned vehicle, the profile comprising age, mileage, and location of the owned vehicle, receiving monitoring data of the owned vehicle, and receiving disposal data for non-owned vehicles corresponding to the profile. The method may further comprise receiving wear-and-tear scores for the non-owned vehicles corresponding to the profile, generating a wear-and-tear score for the owned vehicle based on the monitoring data, and providing a recommended disposal time for the owned vehicle, based on the received disposal data for the non-owned vehicles, the wear-and-tear scores for the non-owned vehicles, and the wear-and-tear score for the owned vehicle.

Consistent with another disclosed embodiment, a system for providing a disposal recommendation for an owned vehicle is provides. The system may comprise a database configured to store a profile for the owned vehicle, the owned vehicle profile comprising age, mileage, and location of the first vehicle. The database may further be configured to store monitoring data for the owned vehicle, and store sales data for non-owned vehicles corresponding to the profile. The system may further comprise one or more memory devices storing instructions, and one or more processors executing the instructions to perform operations that may include generating predicted depreciation data of the owned vehicle, based on the sales data and the monitoring data, and providing a recommended disposal time for the owned vehicle, based on the predicted depreciation data.

Consistent with other disclosed embodiments, a memory device storing instructions may store program instructions, which are executed by at least one processor device and perform any of the methods described herein.

The foregoing general description and the following detailed description are exemplary and explanatory only and are not restrictive of the claims.

BRIEF DESCRIPTION OF THE DRAWINGS

The accompanying drawings are not necessarily to scale or exhaustive. Instead, the emphasis is generally placed upon illustrating the principles of the inventions described herein. These drawings, which are incorporated in and constitute a part of this specification, illustrate several embodiments consistent with the disclosure and, together with the detailed description, serve to explain the principles of the disclosure. In the drawings:

FIG. 19 is a graph of an exemplary probability distribution for selling vehicles as a function of a vehicle age consistent with disclosed embodiments.

DETAILED DESCRIPTION

Figure 1:
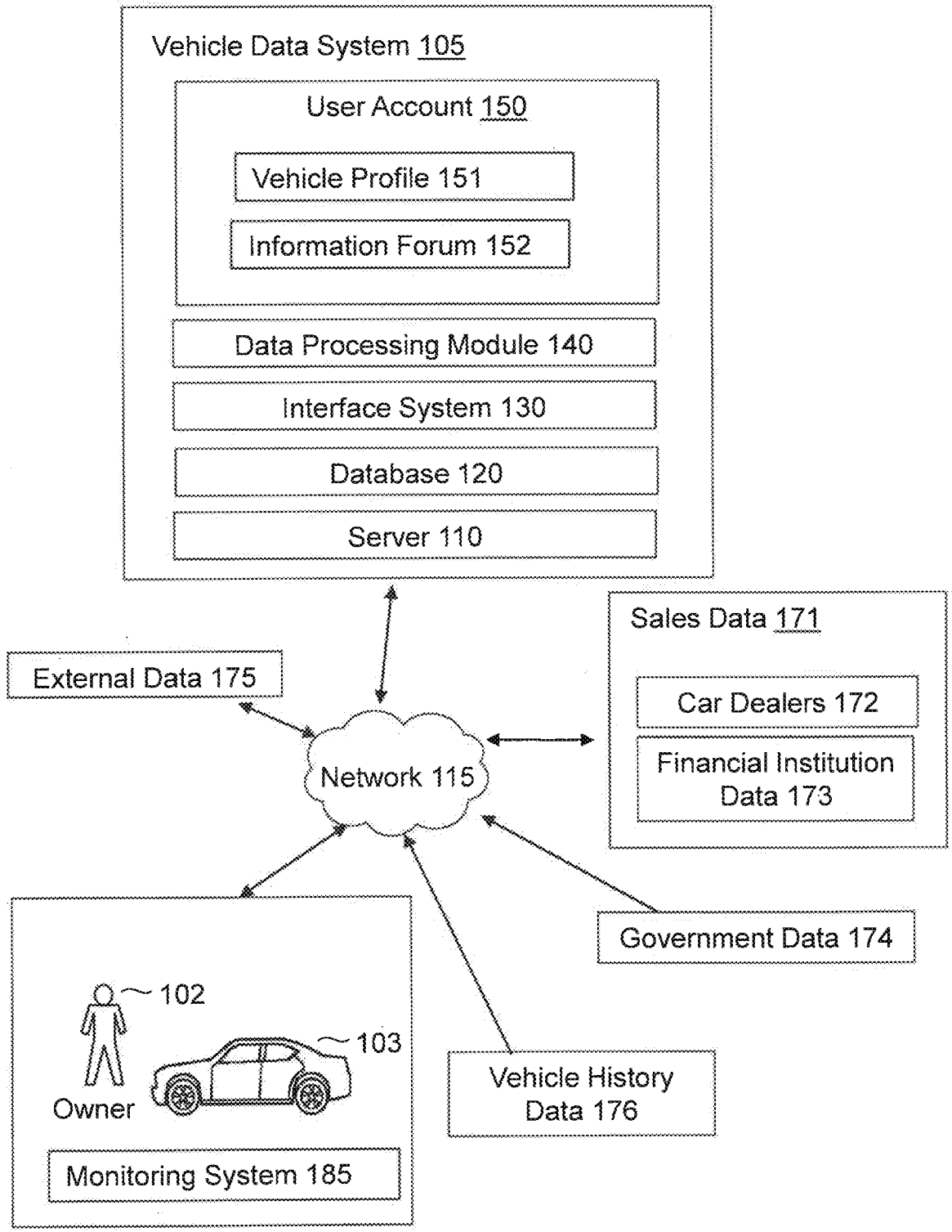
FIG. 1 is a diagram of an exemplary system for managing vehicle-related data consistent with disclosed embodiments.

Reference will now be made in detail to exemplary embodiments, discussed with regards to the accompanying drawings. In some instances, the same reference numbers will be used throughout the drawings and the following description to refer to the same or like parts. Unless otherwise defined, technical and/or scientific terms have the meaning commonly understood by one of ordinary skill in the art. The disclosed embodiments are described in sufficient detail to enable those skilled in the art to practice the disclosed embodiments. It is to be understood that other embodiments may be utilized and that changes may be made without departing from the scope of the disclosed embodiments. Thus, the materials, methods, and examples are illustrative only and are not intended to be necessarily limiting.

The disclosed embodiments describe systems and methods for determining the vehicle value and for providing a recommendation for when to sell a vehicle. As used herein, unless otherwise noted, the term "vehicle" may include various types of vehicles. For example, a vehicle may include a car, a scooter, a bicycle, a motorcycle, a plane, a boat, a water scooter, or the like. In some cases, the disclosed embodiments, when applicable to the discussion, may relate to systems and methods for determining the equipment value and for providing a recommendation when to sell the equipment. In some embodiments, the equipment may include various tools (e.g., power tools, etc.).

As used herein, unless otherwise noted, the term "depreciation" refers to a loss in a value of a vehicle relative to a price paid for the new vehicle. For example, a car that costs $30,000 when new, and $26,000 after one year of use, the car depreciation is $4,000 or 14% loss from the original price. In the present disclosure, vehicle depreciation may be defined either in terms of price loss (e.g., $4,000) or in terms of percentage loss (e.g., 14% loss from the original price). The term "price," "current price" or "expected price" is the amount of money that an inventory owner is expecting to get when selling the inventory.

The vehicle depreciation is one of the costs to a vehicle owner associated with owning a vehicle. Another cost is vehicle maintenance. Vehicle maintenance may include costs associated with repairing the vehicle, cleaning the vehicle, operating the vehicle or making payments on the vehicle. The described vehicle maintenance costs are only illustrative, and other vehicle costs may be presented to the vehicle owner.

Vehicle maintenance may be closely related to the term "wear-and-tear score" associated with the vehicle. The wear-and-tear score relates to a condition of the vehicle and is assigned to the vehicle based on various possible methods discussed further. In some embodiments, a wear-and-tear score may include a single number, and in some cases, the wear-and-tear score may contain a list of numbers (e.g., {Score 1, Score 2, . . . Score N}) detailing score for various aspects of the vehicle. For example, in some embodiments, a first score (Score 1) may be related to an outward appearance of the vehicle, while a second score (Score 2) may be related to a condition of a mechanical component of the vehicle.

FIG. 1 shows a system 100 consistent with various embodiments of the present invention. In various embodiments, system 100 may be configured to collect and process vehicle data, receive inquiries about the vehicle data from vehicle owners, and communicate data for the requested inquiries to the vehicle owners. In some embodiments, system 100 may be associated with a vehicle owner, and in some embodiments, system 100 may be provided by a third party for vehicle owners.

System 100 includes a vehicle data system 105 coupled through a network 115 to a vehicle owner 102. System 100 may further include sales data (i.e., data related to sales of various vehicles) 171, government (e.g., Department of Motor Vehicles—DMV) data 174, external data 175, and vehicle history data 176. Sales data 171 may include data obtained from car dealers/car auctions 172 or the like, as well as data 173 from financial institutions.

System 100 may allow vehicle data system 105 to communicate with network 115 via a server 110, store data in a database 120, and process vehicle-related data via a data processing module 140. In various embodiments, system 100 may communicate with vehicle owner 102 through an interface 130. System 100 may include a computer-readable storage medium that can retain and store program instructions for execution by a processor.

The computer-readable storage medium may be, for example, but is not limited to, an electronic storage device, a magnetic storage device, an optical storage device, an electromagnetic storage device, or any suitable combination of the foregoing. A non-exhaustive list of more specific examples of the computer-readable storage medium may include a hard disk, a random access memory (RAM), a read-only memory (ROM), an erasable programmable read-only memory (EPROM or Flash memory), a static random access memory (SRAM), a portable compact disc read-only memory (CDROM), a digital versatile disk (DVD), a memory stick, or/and the like.

Program instructions stored on a computer-readable storage medium may include assembler instructions, machine dependent instructions, firmware instructions, source code or object code written in any combination of one or more programming languages, including an object oriented programming languages, procedural programming languages or functional programming languages. The programming language may be Fortran, Lisp, C++ or the like. The program instructions may be executed by a processor of the interaction system. In some embodiments, the program instructions may be executed by a processor of the user device, and in some embodiments, both the user device processor and the processor of the interaction system may execute program instructions.

In various embodiments, vehicle data system 105 may receive sales data 171 related to various vehicles via server 110 and store sales data 171 in database 120. In some embodiments, sales data 171 may include car dealers' data 172. In some embodiments, car dealers may communicate data 172 voluntarily, and, in some embodiments, car dealers' data 172 may be obtained by collecting information from a dealer's website which may be accessed over network 115. Collected sales data 171 may include pricing data, as well as data related to the year, make, model, trim line, mileage of the vehicle or the like. In some embodiments, sales data 171 may be collected from polling companies, inventory management companies or listing aggregators which may obtain and store inventory data from one or more of dealers. Inventory polling companies, for example, are typically commissioned by the dealer to pull car dealers data 172 and format the data for use on websites; thus, inventory polling companies may contain all the necessary data 172 available from car dealers.

In various embodiments, vehicle data system 105 may receive financial institution data 173 related to sales data 171 for various vehicles. Financial institution data 173 may include data from entities such as banks, credit union, etc. that provide any type of financial services to a participant involved in the purchase of a vehicle. For example, when a buyer purchases a vehicle, the buyer may utilize a loan from a financial institution, where the loan process usually requires two steps: applying for the loan and contracting the loan. These two steps may utilize vehicle and consumer information in order for the financial institution to properly assess and understand the risk profile of the loan. Typically, both the loan application and loan agreement include proposed and actual sales prices of the vehicle. While vehicle data system 105 may be implemented by a first party, in some embodiments of the present invention, system 105 may be associated with a financial institution.

In various embodiments, vehicle data system 105 may receive government data 174 related to various vehicles. Government data 174 may be associated with sales data 171. Government data 174 may include any data related to a vehicle. For example, when the vehicle is purchased, it must be registered with the state (for example, DMV, Secretary of State, etc.) for tax and titling purposes. Government data 174 associated with such purchase typically includes vehicle attributes (for example, model year, make, model, mileage, etc.) and sales transaction prices for tax purposes. As used herein, unless otherwise noted, the term "vehicle attributes" includes vehicle make, model, year, and trim line. In various embodiments, unless otherwise noted, when comparing vehicles, vehicles with the same vehicle attributes are compared.

In some embodiments, system 105 may receive external data 175 related to sales data 171 for various vehicles. External data 175 may comprise various other information sources, online or otherwise, which may provide other types of desired data, such as data regarding location of vehicles, demographics at vehicle locations, current economic conditions, fuel prices, interest rates, and vehicle insurance rates that may influence current and future vehicle prices. In some embodiments, external data 175 may include data from manufacturers. In order to guide the pricing of their vehicles, the manufacturers may provide an invoice price and a manufacturer's suggested retail price (MSRP) for vehicles to be used as general guidelines for the dealer's vehicle price. These fixed prices may vary slightly by geographic region. In various embodiments, external data 175 for vehicle data system 105 may include vehicle-related data collected from various users driving a variety of vehicles.

In various embodiments, system 105 may receive vehicle history reports such as vehicle history data 176. For example, vehicle history data 176 may be obtained from services such as Carfax Inc. The vehicle history data may include a vehicle year, make, model, trim line, overall vehicle condition as determined by a party not interested in sale of the vehicle (e.g., a professional technician hired to evaluate vehicle condition), number of owners, accident history, service history, registration history, open recalls and vehicle use (e.g., rental, fleet, personal). In some embodiments, history data for a vehicle may include historical data related to sales of the vehicle.

In some embodiments, vehicle data system 105 may obtain by gathering (or receiving) sales data 171 and vehicle history data 176. This data may include sales and historical data for a variety of vehicle configurations. Sales data 171 and vehicle history data 176 may be obtained at different time intervals, where the time interval utilized in any particular embodiment for a certain type of data may be based, at least in part, on how often that data is updated at the source, how often new data of that type is generated, an agreement between the source of the data and the providers of the vehicle data system 105 or a wide variety of other factors.

In various embodiments, vehicle data system 105 may include a data processing module 140, for data analysis and data manipulation. For example, data processing module 140 may evaluate if the obtained data is duplicative, falls within expected ranges, or/and conforms to expected values. In some embodiments, module 140 may compare data for different vehicles and match data that correspond to the same vehicle. In an illustrative embodiment, module 140 may obtain vehicle identifiable information (e.g., vehicle identification number (VIN)) and store all the related information for the vehicle associated with that vehicle identifiable information.

Vehicle data system 105 may interact with vehicle owner 102 operating and owning a vehicle 103 via interface system 130. In various embodiments, vehicle owner 102 may maintain a user account 150 with vehicle data system 105. User account 150 may maintain a vehicle profile 151 as well as an information forum 152 for exchanging data and information with other owners. A vehicle profile is a set of data describing characteristics of the vehicle. In various embodiments, vehicle profile 151 may be used for maintaining data related to the vehicle and the owner.

In various embodiments, vehicle owner 102 may maintain a monitoring system 185 for monitoring the use of vehicles 103. It should be noted that, in various embodiments, vehicle owner 102 may have one or more vehicles 103, and for each vehicle, owner 102 may maintain a separate monitoring system 185.

In various embodiments, monitoring system 185 may include electronic and mechanical devices installed in vehicle 103 that measure various aspects of vehicle operation such as, for example, vehicle acceleration and deceleration (i.e., braking), vehicle speed, vehicle location, duration of a trip, mileage driven during a trip, angle and frequency of turning the vehicle, speed of a vehicle during various vehicle turns, road condition based on vibration of the vehicle and/or the like. In an illustrative embodiment, an electronic device may include a smartphone.

In an example embodiment, various parameters other than the ones listed above may be monitored by monitoring system 185. For example, system 185 may monitor an oil-changing date, an oil-changing target due date, a filter-changing date, a belt-changing date, and various information obtained from collecting onboard diagnostic data (OBD). The OBD data may be collected, for example, by electronic devices, such as OBD scanners, and transmitted to vehicle owner system 190 wirelessly, via a wired connection, or via removable storage devices such as USB drives, memory cards, removable hard drives or the like.

In various embodiments, vehicle owner 102 may store vehicle-related data in vehicle profile 151. Vehicle profile 151 may use database 120 for maintaining the vehicle and owner related data. In some embodiments, vehicle profile 151 may include relevant information about vehicle 103 such as vehicles' make, model, trim line, powertrain, options, geographical location, overall vehicle condition as determined by a mechanic, vehicle history, such as service history, as well as vehicle expected depreciation. As used herein, unless otherwise noted, the term "vehicle data" refers to any data that can be stored in vehicle profile 151 or database 120. In various embodiments, data associated with vehicle 103 may be presented to vehicle owner 102 through graphs or tables via interface system 130.

In various embodiments, vehicle profile 151 may contain any vehicle data that may be used by vehicle owner 102 to infer when to dispose of vehicle 103. In some embodiments, vehicle profile 151 may contain links to vehicle data for other vehicles that have the same vehicle attributes as the attributes of vehicle 103.

In various embodiments, data processing module 140 may be used to analyze and manipulate data stored in vehicle profile 151 or in database 120. For example, data processing module 140 may evaluate depreciation of vehicle 103 as well as an opportunity cost of maintaining vehicle 103. In some embodiments, data processing module 140 may obtain data related to various vehicles from database 120 of vehicle data system 105 and evaluate tradeoffs in opportunity costs for vehicle owner 102 resulted from selling vehicle 103. In various embodiments, data processing module 140 may suggest vehicle owner 102 alternative vehicles that may provide owner 102 more satisfaction than the currently owned vehicle. The data obtained by data processing module 140 through analysis of data in vehicle profile 151 and database 120 may be presented to vehicle owner 102 in a variety of ways via interface 130, such as through bar graphs, charts, tables, web pages or the like. In various embodiments, interface 130 may include, for example, a set of interactive web pages provided by vehicle data system 105.

In various embodiments, vehicle owner 102 may use interface 130 of system 105 to obtain various related information about other vehicles that vehicle owner may consider purchasing. For example, using vehicle data system 105, vehicle owner 102 may specify a vehicle configuration by defining values for vehicle attributes (make, model, trim line, powertrain, options, etc.) and/or other relevant information such as a geographical location. Information associated with the specified vehicle configuration may include a price of the vehicle and the expected vehicle depreciation. This information may then be presented to vehicle owner 102 through interface 130.

Figure 2:
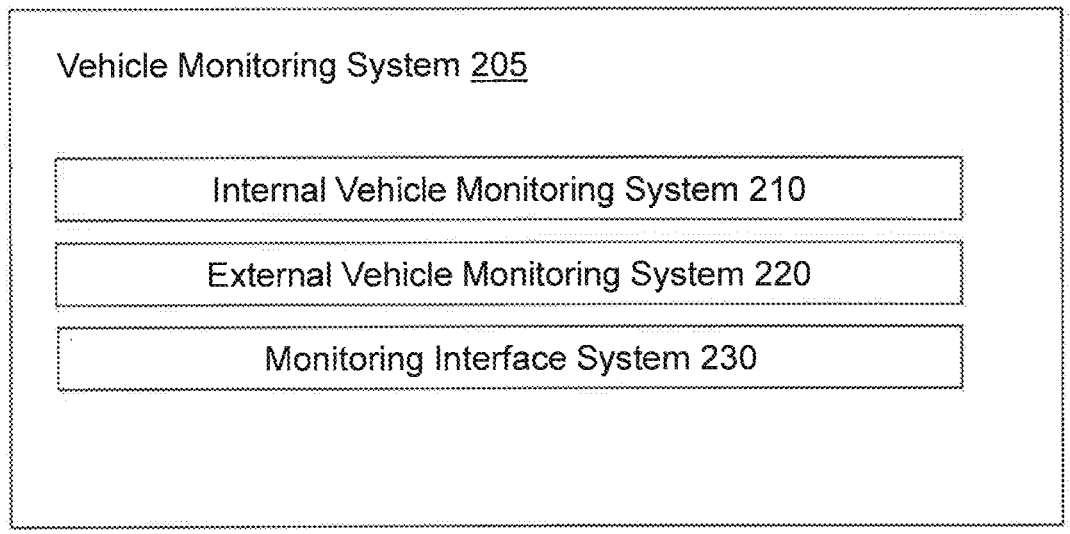
FIG. 2 is a diagram of an exemplary vehicle monitoring system, consistent with disclosed embodiments.

In some embodiments, vehicle owner 102 may maintain monitoring system 185 that may include multiple components that are shown for example in FIG. 2. In some embodiments, system 185 may include an internal vehicle monitoring system 210, an external vehicle monitoring system 220, and a monitoring interface system 230.

Internal vehicle monitoring system 210 may be used to monitor internal parameters of vehicle 103 such as OBD data collected with an OBD scanner. This monitoring data may include reporting faulty sensors (e.g., mass air flow sensor is faulty), low fuel pressure that can be related to dirty fuel filter, exhaust leak between the first oxygen sensor and engine, faulty oxygen sensor, misfire due to plugged fuel injector, catalytic converter failure, transmission range sensor circuit malfunction, or the like. In some embodiments, additional internal parameters may include failure of a timing belt that may be indicated by check engine light, brake failure (e.g., braking light is on), or odd noises generated by vehicle 103. Internal vehicle monitoring system 210 may include various sensors and scanners attached to a vehicle, such as OBD scanner, microphones positioned at various locations in the vehicle and connected to an audio recording device, temperature sensors, gas sensors, video cameras positioned at various locations in vehicle 103 and connected to video recording devices, or the like. In some embodiments, the sensors may include accelerometers and gyroscopes that may provide data to a data storage unit that may be associated with system 210. In some embodiments, system 210 may further include a mobile device such as a smartphone for monitoring the vehicle location, speed, changes in the vehicle direction (e.g., cornering), as well as acceleration and decelerating of the vehicle.

In various embodiments, monitoring system 185 may also include an external vehicle monitoring system 220. System 220 may include one or more microphones, one or more cameras and/or one or more sensors for monitoring a vehicle interior and a vehicle exterior condition. For example, system 220 may include a camera that observes the maintenance of the vehicle interior. In some embodiments, exterior system 220 may include cameras that observe the vehicle exterior, such as the presence of dents and scratches on the vehicle exterior. In some embodiments, system 220 may include sensors that may detect a vehicle collision with other vehicles or objects. For example, system 220 may include a sensor that indicates that the vehicle has been hit from the back of the vehicle, from the front of the vehicle, from the side of the vehicle or the like. In some embodiments, the sensors associated with system 220 may detect that the vehicle has been impacted at a particular location. For example, sensors of system 220 may indicate that vehicle 103 has been impacted by an opening door of another vehicle. In some embodiments, the sensors may correlate the accelerometer data with the visual/sound data observed from a set of cameras or microphones, or in some embodiments, correlate the accelerometer data with available data related to the location of the vehicle. In an illustrative embodiment, sensors may detect the presence of a bump on a road and correlate the visual data of the bump with a vertical vibration of the vehicle as it passes over the bump. In addition, the sensors may correlate the vertical vibration with the speed of the vehicle while the vehicle is passing over the bump. In some embodiments, the presence of the bump may be obtained from the external data (e.g., data associated with the GPS location of the vehicle) that can be received by system 220.

In various embodiments, system 220 may also monitor weather condition at the location of the vehicle. For example, system 220 may include temperature sensors, air pressure sensors, wind sensors, humidity sensors, air quality sensors, salinity sensors (e.g., for detecting a presence of salt on a road), dust sensors, road condition sensors (e.g., for detecting a presence of bumps, water, dirt on a road), radiation sensors (e.g., for detecting an ultraviolet radiation), ozone sensors, or the like. As used herein, unless otherwise noted, the term "monitoring data" refers to any type of data that can be monitored by monitoring system 185.

In various embodiments, systems 210 and 220 may store the monitoring data in an associated data storage unit, and transmit the monitoring data to vehicle profile 151 of the user account 150. In some embodiments, the monitoring data may also be transmitted via a wireless or a mobile network, or via a dongle that may be connected to the data storage unit using a USB port. In some embodiments, the monitoring data may be transmitted via a mobile network at a predetermined frequency, and in some cases, data may be transmitted via the mobile network when a signal strength for the network is above a threshold value. For example, the monitoring data may be transmitted when the mobile network corresponds to a signal strength of the LTE connection. In some embodiments, the monitoring data may be transmitted after a significant vehicle-related event. For example, the monitoring data may be transmitted when a vehicle is hit, when the vehicle is operated outside standard vehicle operating regulations (e.g., the vehicle is speeding, the vehicle is involved in a collision, the vehicle reports a high deceleration or acceleration, or when the vehicle has faulty mechanical or electrical components, such as faulty brakes). When vehicle 103 is operated outside standard vehicle operating regulations, the monitoring data may not only be transmitted to vehicle profile 151, but also directly notify vehicle owner 102, or the monitoring data may be recorded in vehicle profile 151 and flagged for further analysis.

While the present discussion focuses on vehicles for transportation, such as cars, it is noted that other vehicles or other inventory may have monitoring functions that are specific to that type of inventory. For example, for the inventory including construction machinery, the external vehicle monitoring system 220 may include sensors that measure the amount of weight carried or lifted by the construction machinery, the machinery traction with the ground, the reaction force received by machinery during excavation, lifting, and drilling processes. In various embodiments, internal vehicle monitoring system 210 may receive data related to hydraulic pumps, and various mechanical components that may be unique to the machinery. In various embodiments, monitoring system 185 can be used for boats, airplanes, trains, bicycles, motorcycles or the like, with systems 210 and 220 tailored for a monitored vehicle. For example, when monitoring boats, monitoring system 185 may include sensors associated with leaks, humidity sensors, and sensors associated with surfaces of a hull of a boat to monitor the presence of growth (e.g., algae, barnacles, etc.)

Monitoring system 185 may not only monitor various aspects relating to vehicle 103 but may also be configured to monitor and record data associated with owner 102. In an example embodiment, monitoring system 185 may monitor possible impairment of owner 102. For instance, monitoring system 185 may detect if owner 102 is driving under the influence, or is unusually agitated. In some instances, when selected by owner 102, monitoring system 185 may monitor movements of user owner 102, owner's emotional state (e.g., monitoring system 185 may monitor emotional state via video camera or audio recording), as well as actions of passengers in vehicle 103.

FIG. 2 shows that monitoring system 185 may include a monitoring interface system 230 associated with vehicle owner 102. Interface system 230 may allow owner 102 to monitor various parameters of vehicle 103, such as vehicle speed, location, vehicle mechanical/electrical condition, acceleration, etc. In some embodiments, interface system 230 may allow owner 102 to monitor vehicle in real time, and in some instances, monitoring system 230 may alarm owner 180 when vehicle 103 is operated outside standard vehicle operating regulations, or when vehicle experience mechanical/electrical failure or vehicle collision.

Figure 3:
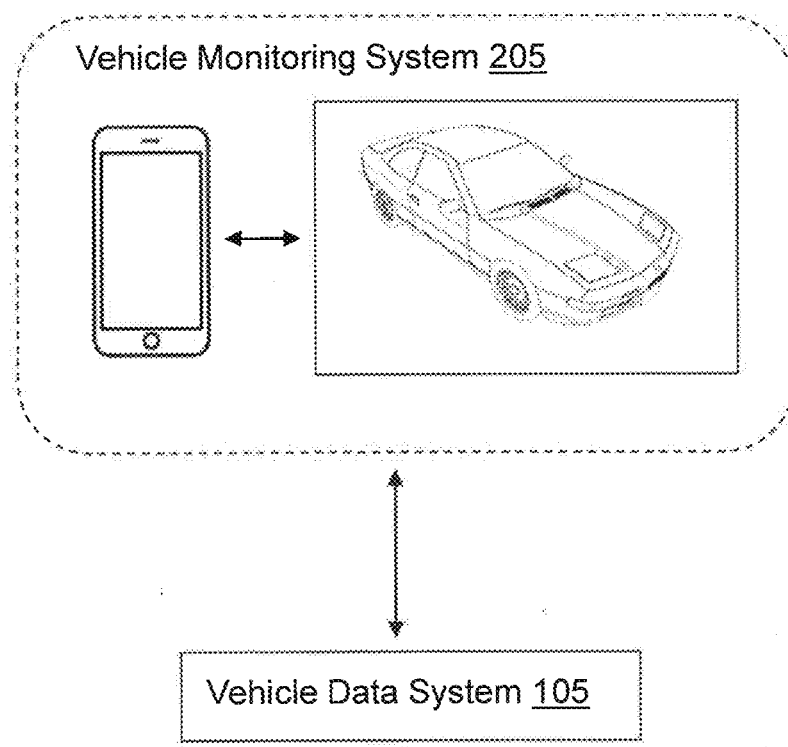
FIG. 3 is a diagram showing details of the vehicle monitoring system of FIG. 2 and an exemplary vehicle data system, consistent with disclosed embodiments.

In various embodiments, interface system 230 may include a screen that displays various parameters associated with vehicle 103. In some embodiments, owner 102 may select the parameters to be displayed on the screen by interacting with a screen through a touchscreen or through a set of user inputs, such as buttons. In some embodiments, interface system 230 may include a software application installed on a user mobile device such as a smartphone for interacting with monitoring system 185, as shown for example in FIG. 3. In some cases, vehicle monitoring system 185 may include a smartphone as a part of system 185 in communication with vehicle profile 151 of vehicle data system 105 as shown in FIG. 3.

In various embodiments, people related to owner 102 may be allowed to access user account 150. For example, user account 150 may have a first set of permissions associated with user account 150 being accessed by owner 102, and may have a second set of permissions associated with user account being accessed by people related to owner 102. For example, owner 102 may be allowed to change data in vehicle profile 151 of user account 150, and people related to owner 102 may be allowed to read/observe data in user account 150. In an illustrated embodiment, people related to owner 102 may include relatives or friends of owner 102. In some embodiments, user account 150 may be configured to allow relatives to interact with owner 102 through interface system 130. For example, a relative may inform owner 102 that vehicle 103 is being operated outside standard vehicle operating regulations, that vehicle 103 is experiencing a failure, or that vehicle 103 requires maintenance. In some cases, a relative may track the location of owner 102. In some embodiments, owner 102 may interact with other relatives about various aspects of operating vehicle 103 via interface system 130. For example, owner 102 may request information of vehicle clearance height, vehicle ride height, vehicle acceptable load, or the like.

Figure 4:
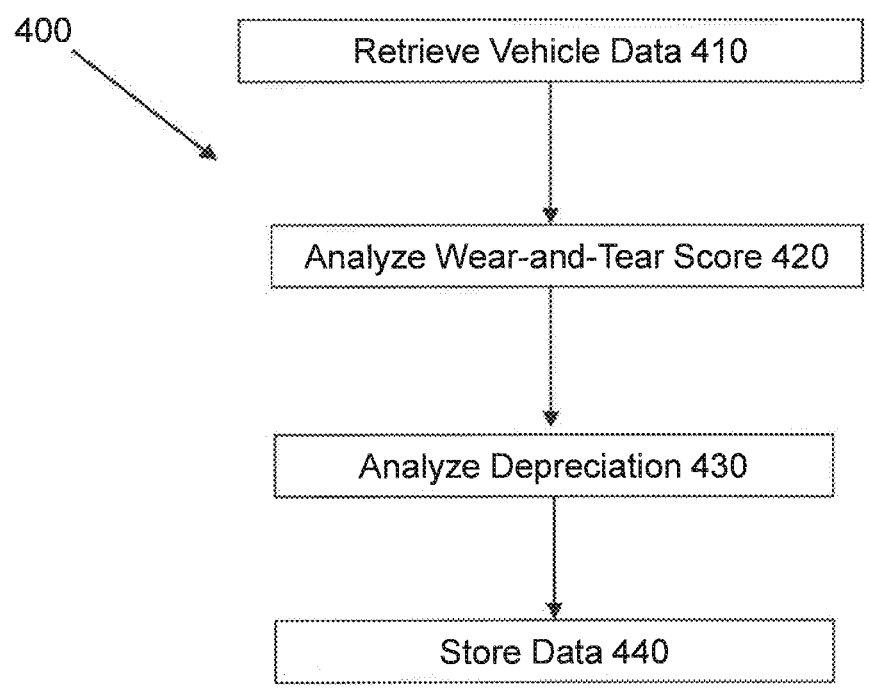
FIG. 4 is a flowchart of an exemplary process of analyzing vehicle-related data, consistent with disclosed embodiments.

In various embodiments, streaming monitoring data may be uploaded to vehicle profile 151 as a part of the history of the monitoring data stored in vehicle profile 151. The streaming monitoring data and previously recorded monitoring data may be processed by data processing module 140. FIG. 4 shows an exemplary process 400 for analyzing the vehicle data. At step 410 of process 400, vehicle data associated with vehicle 103 may be retrieved. The vehicle data may include the monitoring data associated with vehicle 103, as well as repairs associated with vehicle 103. In various embodiments, system 105 may be configured to store repair data for non-owned vehicles corresponding to the profile associated with vehicle 103 (i.e., corresponding to attributes of vehicle 103) as a part of vehicle profile data. In various embodiments, system 105 may be configured to incorporate information about possible repair data when providing the recommendation for selling vehicle 103. In various embodiments, the repair data may be stored in database 120 and may be accessed from vehicle profile 151. In various embodiments, the repair data may include a type of the repair, a labor cost of the repair, and a parts cost of the repair associated with repairing vehicle 103. At step 420, data processing module 140 may evaluate a vehicle wear-and-tear score. The wear-and-tear score may be calculated based on vehicle data such as vehicle monitoring data, vehicle age, vehicle mileage, as well as repairs associated with vehicle 103.

In various embodiments, owners 102 may share the monitoring data associated with their vehicle 103 anonymously with all the users of system 105. In an example embodiment, owner 102 may share the monitoring data by anonymously uploading the monitoring data to database 120 for vehicle 103. When sharing the monitoring data, vehicle attributes for vehicle 103 that are not related to personally identifiable information (e.g., VIN, license plate, the name of the user, etc.) may also be shared. Vehicle owners 102 may share the monitoring data in order to obtain access to the monitoring data of other owners. Alternatively, system 105 may encourage sharing of the monitoring data by providing incentives to owners. For example, system 105 may perform a data analysis for owners 102 if owners 102 share their monitoring data with the other owners. As data is shared anonymously, vehicle system 105 may not be configured to share identities of owners 102 driving vehicles 103. In various embodiments, vehicle system 105 may provide other incentives and advertising for owners sharing the data in return for the value obtained from their monitoring data.

In various embodiments, owners 102 with user accounts 150 may share not only the monitoring data but also the repair and sales data associated with vehicles 103. In an example embodiment, owners 102 may share the sales data of their vehicles, the repair data for their vehicles, the vehicles that they are interested in purchasing in the future, or/and the updates to their vehicles. In various embodiments, vehicle system 105 may be configured to poll owners 102 about various aspects of their vehicles and provide them with various inputs from the other owners. For example, vehicle data system 105 may provide owners 102 a daily digest of the latest trends in vehicles related to vehicles that are similar to vehicle 103. In some embodiments, vehicle system 105 may provide statistical data for reliability and depreciation of vehicles with vehicle attributes similar to the ones of vehicle 103. As used herein, unless otherwise noted, the term "similar vehicle" may refer to a vehicle with at least a year and a make, that is the same as the year and the make of the other vehicle.

In an illustrative embodiment, data processing module 140 of vehicle data system 105 may be configured to calculate a wear-and-tear score based on depreciation of various vehicles 103 owned by owners 102 that maintain user account 150 with system 105. For example, vehicle data system 105 may maintain historical depreciation values for all vehicles 103 maintained and disposed of by owners 102. To evaluate a wear-and-tear score for a vehicle with given vehicle attributes, vehicle owner system 102 may retrieve depreciation values and vehicle data for all previously disposed of vehicles matching the given vehicle attributes. In an illustrative embodiments, the vehicle data (e.g., vehicle monitoring data, vehicle age, vehicle mileage, vehicle repairs) associated with the vehicles with low depreciation values may result in a low corresponding wear-and-tear score, while the vehicle data associated with the vehicles with high depreciation values result in high wear-and-tear score, with low wear-and-tear score being a desirable score.

Figure 5:
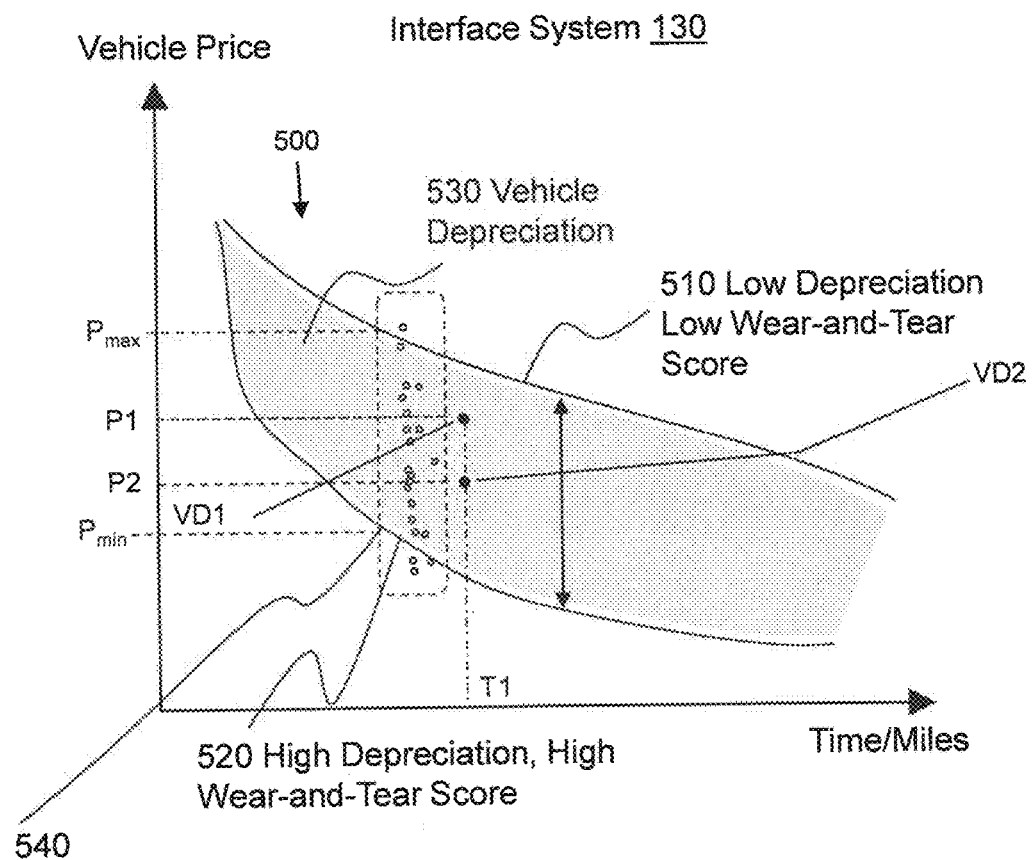
FIG. 5 is a chart illustrating vehicle price as a function of a vehicle age (time) or miles driven by a vehicle, consistent with disclosed embodiments.
Figure 6:
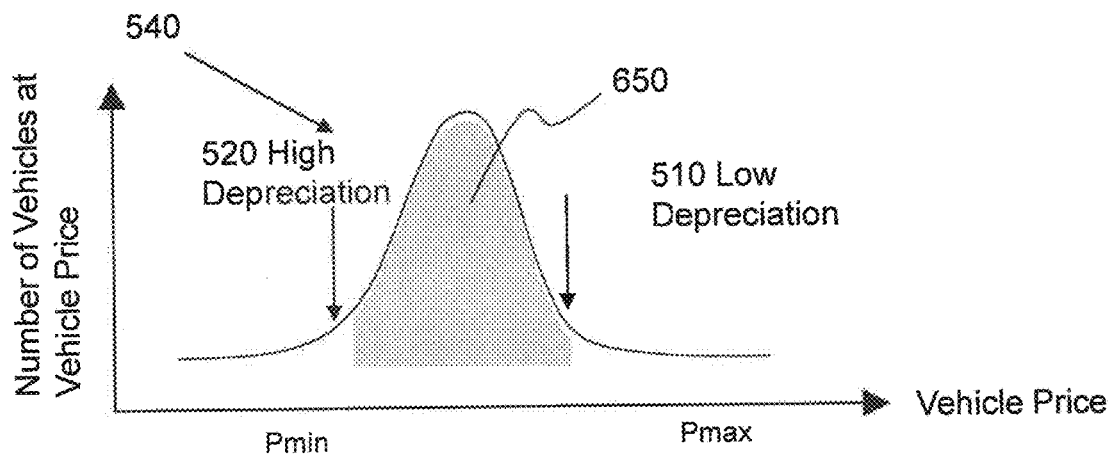
FIG. 6 is a chart illustrating a number of vehicles as a function of a vehicle price for a given vehicle age or miles driven by a vehicle consistent with disclosed embodiments.

FIG. 5 shows an example chart of depreciation of various vehicles as a function of time (i.e., vehicle age) or miles traveled by the vehicle for a vehicle with given vehicle attributes. The chart may be, for example, presented by interface system 130 to owner 102. In an illustrated embodiment, graph 500 may be a graph of points (points in a region 540 are illustrated). For example, the point associated with vehicle data VD1 corresponds to a vehicle sold at price P1 at time/millage T1, while point associated with vehicle data VD2 corresponds to a vehicle sold at price P2 at time/millage T1. Since price P1 is higher than price P2, the vehicle associated with vehicle data VD1 has a lower wear-and-tear score when compared to a wear-and-tear score for the vehicle associated with vehicle data VD2. In various embodiments, the wear-and-tear score may be normalized resulting in the wear-and-tear score for vehicles with price Pmax being zero (the best wear-and-tear score), and the wear-and-tear score for vehicles with price Pmin being 100 (the worst wear-and-tear score). It should be noted that prices Pmax and Pmin are obtained using a statistical approach. For example, FIG. 6 shows the distribution of cars for various vehicle prices as illustrated by vehicle data points in region 540. In illustrative embodiments, the region 650 between point 520 corresponding to vehicles with high depreciation and point 510 corresponding to vehicles with low depreciation may include 95% of all the cars disposed of by owner 102 having time/millage T1 (as shown in FIG. 5). It should be noted, that 95% value is chosen as an illustrative value only, and any suitable value may be used as well.

In various embodiments, vehicle data such as (e.g., vehicle monitoring data, vehicle age, vehicle mileage, and vehicle repairs) for vehicles disposed of at a given price may vary. Thus, different vehicle data may correspond to the same wear-and-tear score based only on depreciation rates for the vehicle.

In various embodiments, the wear-and-tear score may be calculated in various other ways. In an example embodiment, individual wear-and-tear scores may be calculated for various components of the vehicle, and a combined wear-and-tear score may include a set of individual wear-and-tear scores. For example, main vehicle components such as brakes, electrical system, engine, transmission or the like may have associated wear-and-tear scores. In an illustrative embodiment, a wear-and-tear score for a component for a vehicle with particular vehicle attributes may be calculated based on the age of the component, the vehicle mileage, and the monitoring data. In an example embodiment, a wear-and-tear score of a new component may be low (e.g., zero) and may increase during the usage of the vehicle. In an example embodiment, braking data for the vehicle may be used to establish a wear-and-tear score for brakes. For example, a set of braking events (e.g., 1000 braking events resulting in vehicle deceleration above a certain threshold) may increase the wear-and-tear score associated with braking by one unit. The above example of calculating a wear-and-tear score for braking is only illustrative, and other approaches may be used.

Similar to a wear-and-tear score for brakes, a wear-and-tear score may be established for other components. For example, a wear-and-tear score for an engine may, in part, be based on a regularity of an oil change. Similarly, a wearand-tear score of various components may depend on the regularity of maintenance of these components. In some embodiments, the wear-and-tear score for a component may exhibit dramatic changes if monitoring system 185 detects unusual performance of the component. For example, if monitoring system 185 reports the failure of a given component, the wear-and-tear score of such component may be maximum (e.g., 100).

It should be noted, that a wear-and-tear score may be calculated in many other possible ways. In some cases, the wear-and-tear score may be evaluated by a certified technician. In some cases, the wear-and-tear score may be obtained by averaging wear-and-tear score calculated by several different approaches. In some cases, the wear-and-tear score for the entire vehicle can be obtained as a weighted average of individual wear-and-tear scores. In an example embodiment, the weight for an individual wear-and-tear score may be selected based on the importance of components associated with such individual wear-and-tear score.

In some embodiments, wear-and-tear score may be calculated by comparing the monitoring data of vehicle 103 to the monitoring data of other vehicles maintained by system 105 that have wear-and-tear score computed for those vehicles. In an example embodiment, data processing module 140 may process monitoring data and obtain a set of important statistical cumulative and average monitoring parameters such as cumulative vehicle breaking, cumulative vehicle cornering, cumulative vehicle acceleration, cumulative mileage of the vehicle, average time between the vehicle maintenance (e.g., average time between the oil change, average time between transmission fluid change, etc.) and average speed of the vehicle. It should be noted that examples of cumulative and average monitoring parameters described above are only illustrative and various other parameters may be used.

Figure 7:
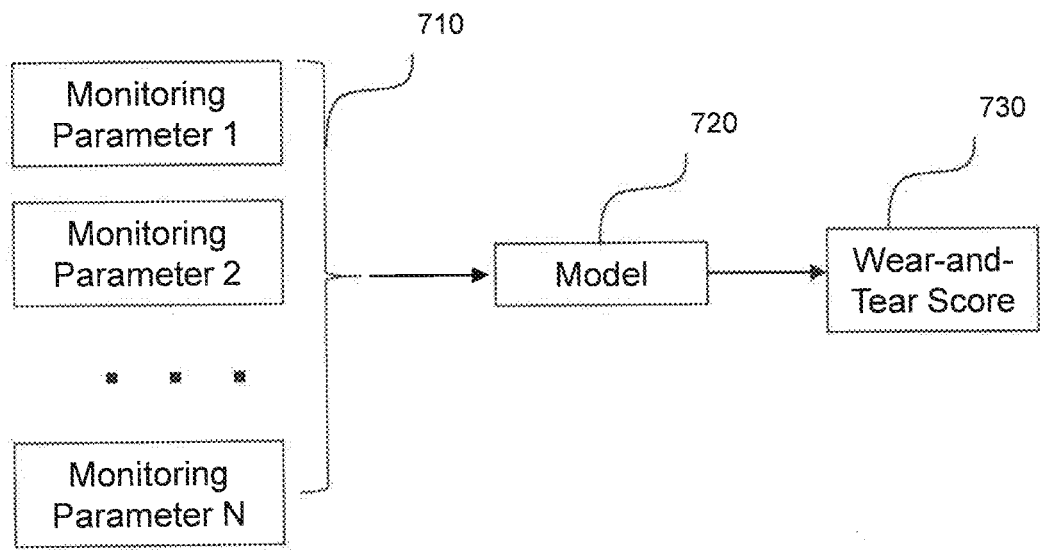
FIG. 7 is a diagram of an illustrative computer-based model for obtaining a vehicle wear-and-tear score using a monitoring data, consistent with disclosed embodiments.

FIG. 7 shows an exemplary embodiment of obtaining a wear-and-tear score 730 for a vehicle using a model 720 for a monitoring data represented by a number of monitoring parameters 710 such as cumulative vehicle breaking, cumulative vehicle cornering, cumulative vehicle acceleration or the like. In various embodiments, wear-and-tear score 730 may be calculated using model 720 that may include machine learning models, such as neural networks, decision trees, and models based on ensemble methods, such as random forests. The machine learning models may have parameters that may be selected for optimizing the performance of model 720. For example, parameters specific to a particular type of model (e.g., the number of features and number of layers in a neural network) may be optimized to improve the model's performance. In some embodiments model 720 may return a single number related to wear-and-tear score of vehicle 103, and in some embodiments wear-and-tear score may include a set of individual wear and tear scores (e.g., Score 1 through Score N) as described above.

Figure 8:
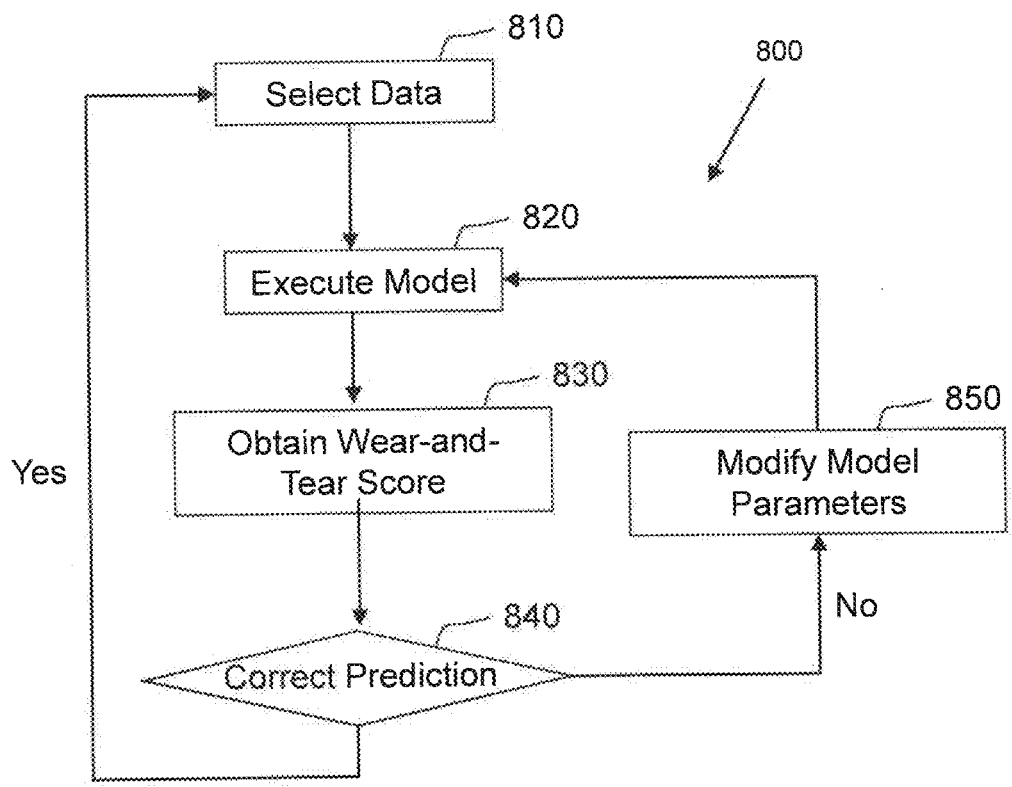
FIG. 8 is a flowchart of an exemplary process of training computer-based models, consistent with disclosed embodiments.

In various embodiments, model 720 may be trained using a data set containing monitoring parameters and wear-and-tear scores of various other vehicles 103 of owners 102 with the associated user account 150. FIG. 8 illustrates an exemplary process 800, of training model 720 for determining wear-and-tear score 730 from monitoring parameters 710. At a step 810 of process 800, training data is selected for training a machine learning model, such as model 720. In various embodiments, the training data may be related to a vehicle with particular vehicle attributes. In various embodiments, the training data may include mileage for an associated vehicle in addition to monitoring parameters 710, as well as related wear-and-tear score, that may be obtained for vehicle 103 using alternative approaches for evaluating wear-and-tear score described above. In some embodiments, the training data may also include repairs done to a vehicle. In various embodiments, training data may include multiple data records, with each record processed consecutively by model 720. At step 810 of process 800, model 720 can acquire a training data record, at a step 820 perform computations, and at a step 830 may generate a predicted wear-and-tear score for the vehicle associated with the training data record. In various embodiments, the predicted wear-and-tear score may be compared with a known wear-and-tear score to evaluate an associated error for model 720 at a step 840. If the error is below the threshold value (step 840, NO), process 800 may proceed to step 810 of acquiring a next training data record 801. If the error is above the threshold value (step 840, YES), process 800 may proceed to a step 850 of modifying model parameters and subsequently returning to step 820. In various embodiments, model 720 may be rated based on the average error generated by model 720. In various embodiments, a model may be tailored for each vehicle with given vehicle attributes.

In various embodiments, the external condition of the vehicle and performance of various options within a vehicle may significantly affect the overall wear-and-tear score for the vehicle as the vehicle may not be appealing to buyers; thus affecting the vehicle depreciation. For example, if a vehicle contains dents and stains in the vehicle interior, the wear-and-tear score for the vehicle may be increased. Thus, the external condition of the vehicle may be considered as one of the components of a vehicle for calculating a wear-and-tear score. In various embodiments, the individual wear-and-tear score based only on external condition of the vehicle may be evaluated by considering depreciation of other vehicles having the same vehicle attributes and similar individual wear-and-tear scores for various vehicle components other than the external condition of a vehicle.

Returning to the flowchart of FIG. 4, at step 430, data processing module 140 may analyze a vehicle depreciation based on the wear-and-tear score for vehicle 103 and at step 440, data processing module 140 may store data including wear-and-tear score and the predicted depreciation for vehicle 103 in database 120 and vehicle profile 151. The vehicle depreciation may be estimated at step 430 based on the correlation between the depreciation of previously disposed of vehicles and their reported wear-and-tear scores.

Figure 9:
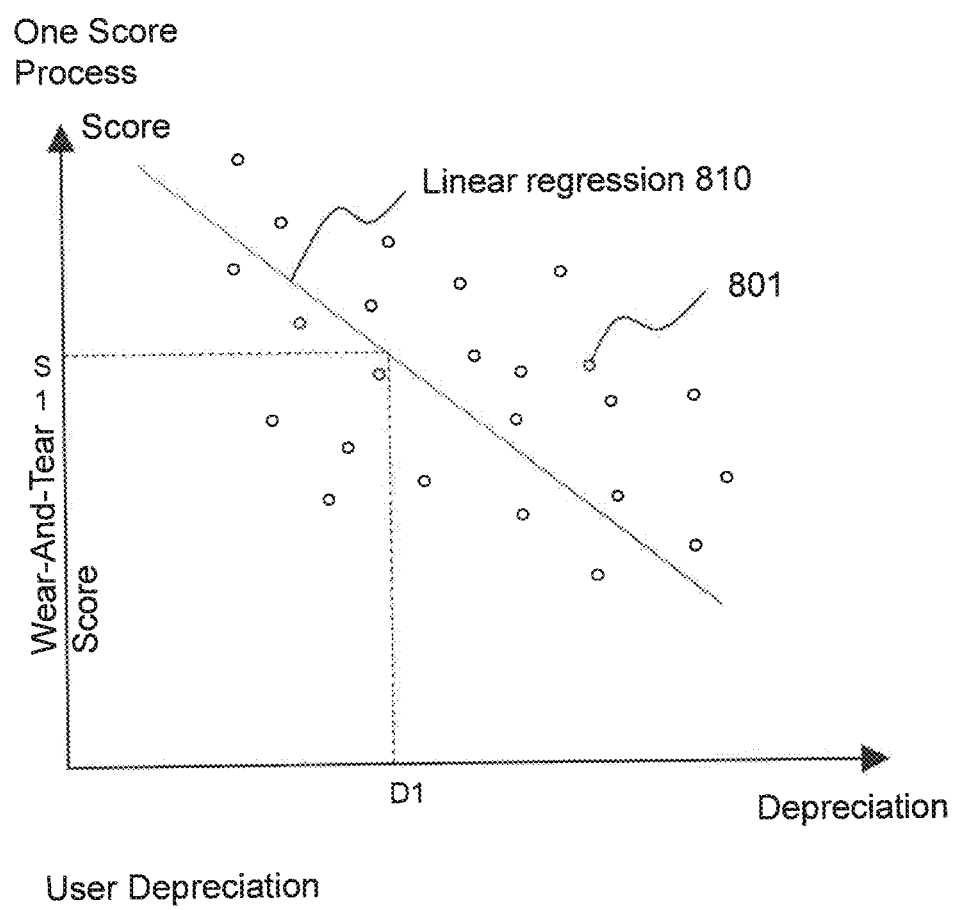
FIG. 9 is a graph of an exemplary relationship between vehicle depreciation and a wear-and-tear score for the vehicle, consistent with disclosed embodiments.

In an illustrative example shown in FIG. 9, a wear-and-tear score and related depreciation of previously disposed of vehicles are plotted as a set of points 901. A linear regression line 910 may be plotted through the set of points, as shown in FIG. 9. Using a calculated wear-and-tear score for vehicle 103 (e.g., S1) vehicle owner 102 may obtain the expected depreciation of the vehicle D1 as shown in the FIG. 8 In various embodiments, as explained before, a wear-and-tear score for a vehicle may be calculated based on vehicle data such as vehicle monitoring data, a vehicle age, a vehicle mileage, as well as repairs associated with vehicle 103.

Figure 10:
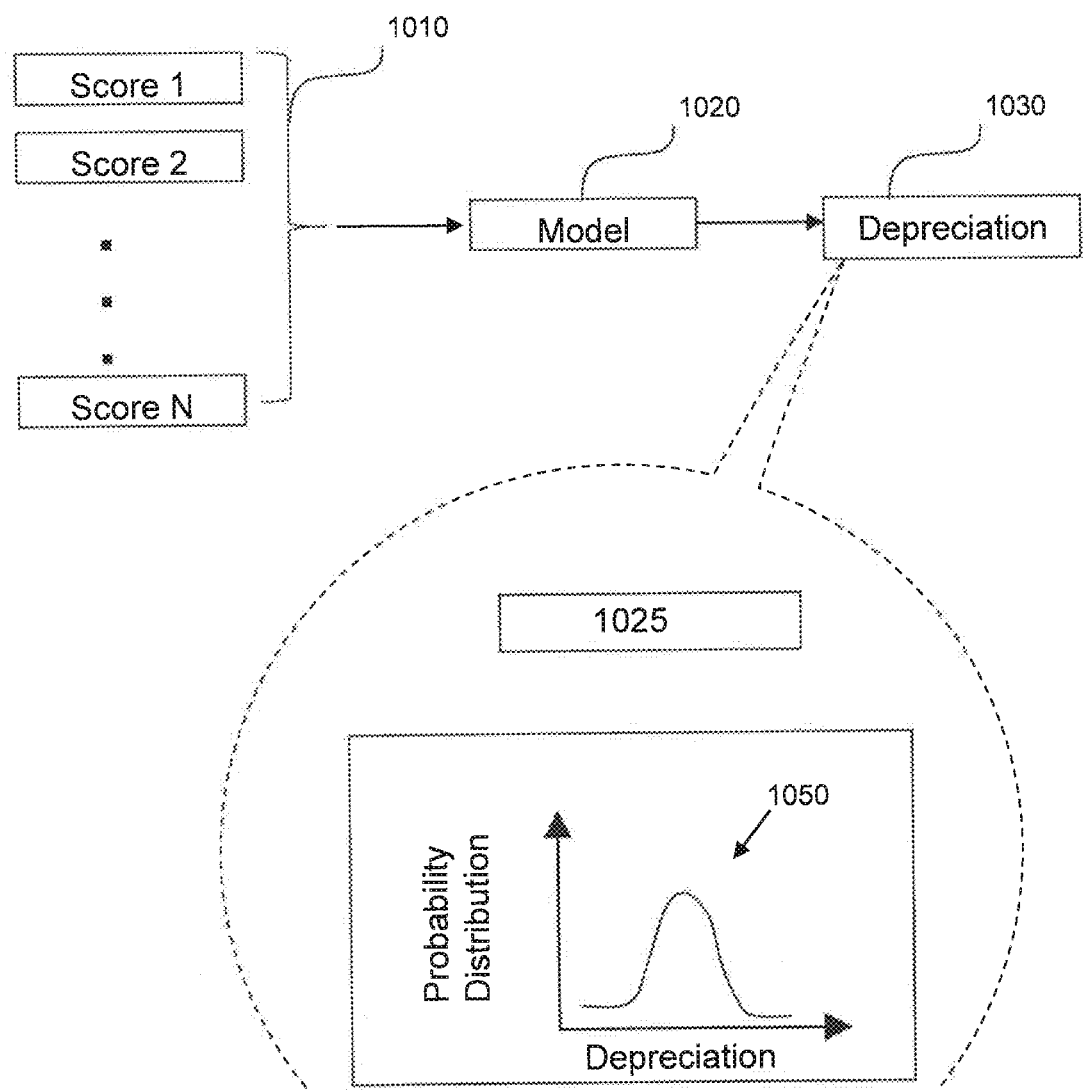
FIG. 10 is a diagram of an exemplary computer-based model for obtaining a probability distribution of vehicle depreciation using wear-and-tear score consistent with disclosed embodiments.

FIG. 10 shows an exemplary process of obtaining a depreciation rate 1030 for a vehicle using a model 1020 for a wear-and-tear score 1010 represented by a number of individual wear-and-tear scores, Score 1 through Score N. In various embodiments, depreciation rate 1030 may be calculated using model 1020 that may include machine-learning models, such as neural networks, decision trees, and models based on ensemble methods, such as random forests. The machine-learning models may have parameters that may be selected for optimizing the performance of model 1020. For example, parameters specific to a particular type of model (e.g., the number of features and number of layers in a neural network) may be optimized to improve the model's performance. In some embodiments, as shown, for example, in FIG. 10 model 1020 may return a current price for vehicle 103 characterized by a single number as indicated by element 1025, and in some embodiments, as shown in FIG. 10, a model 1020 may return a probability distribution 1050 of possible prices for vehicle 103.

Figure 11:
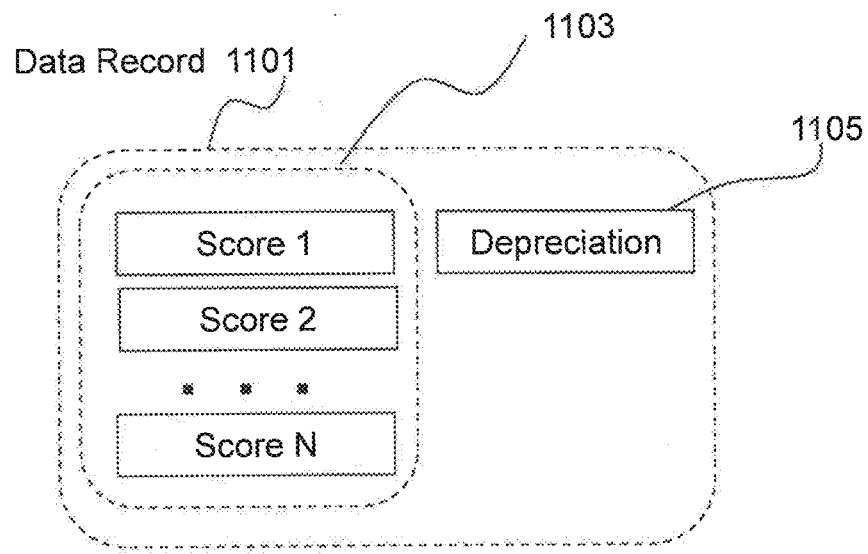
FIG. 11 is a diagram of an exemplary data record for training a machine learning model.
Figure 12:
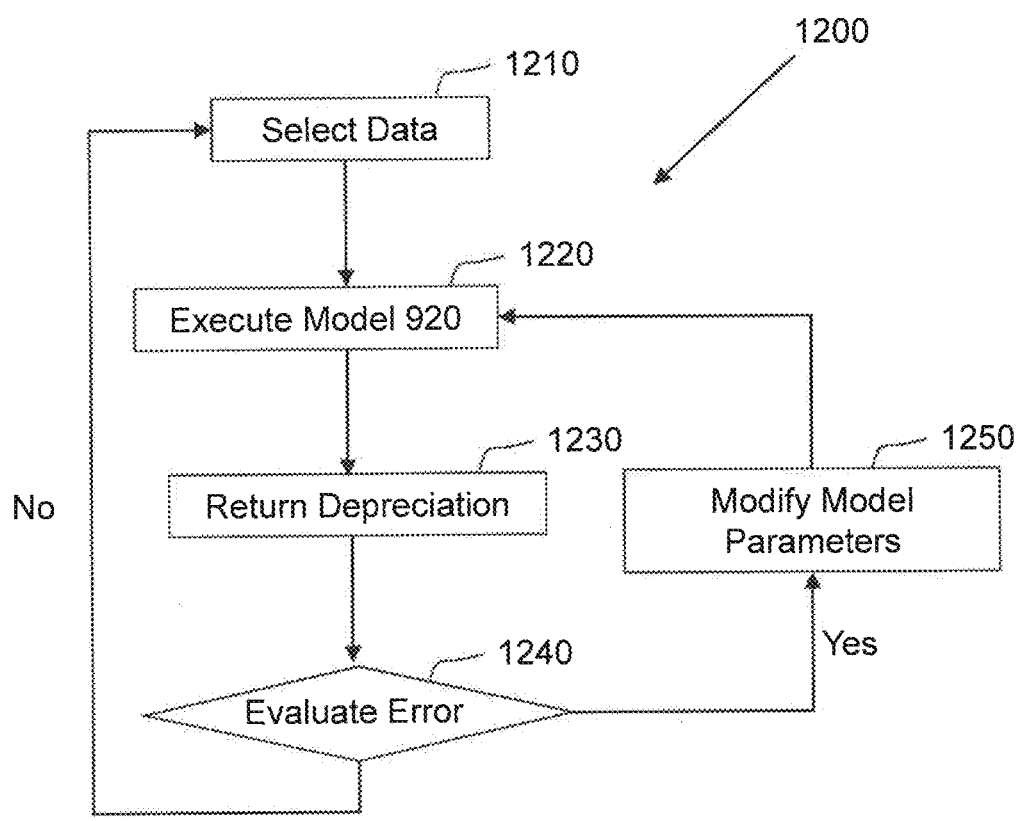
FIG. 12 is a flowchart of an exemplary process of training computer-based models, consistent with disclosed embodiments.

In various embodiments, model 1020 may be trained using a data set containing information related to vehicle data, a wear-and-tear score of a vehicle and a depreciation of previously disposed of vehicles. FIG. 11 illustrates a data record 1101 for training a machine learning model. Data record 1101 may include a wear-and-tear score 1103 that may include a set of individual wear-and-tear scores (e.g., Score 1 through Score N) for a previously sold vehicle, together with vehicle depreciation data 1105. FIG. 12 shows an example embodiment of process 1200, at a step 1210, a training data is selected for training a machine learning model, such as model 1020. In various embodiments, the training data may be related to a vehicle with particular vehicle attributes. In various embodiments, the training data may include mileage for an associated vehicle, in addition to wear-and-tear score 1103 and depreciation data 1105. In some embodiments, the training data may also include repairs done to a vehicle, and in some embodiments, the training data may also include a monitoring data for the vehicle. In various embodiments, training data may include multiple data records 1101, with each record processed consecutively by model 1020. At step 1210 of process 1200, model 1020 can acquire training data record 1101, at a step 1220 perform computations, and at a step 1230 return a predicted depreciation value of the already disposed of vehicle with known depreciation data 1105. In various embodiments, the predicted depreciation value may be compared with depreciation data 1105 to evaluate an associated error for model 1020 at a step 1240. If the error is below the threshold value (step 1240, NO), process 1200 may proceed to step 1210 of acquiring a next training data record 1101. If the error is above the threshold value (step 1240, YES), process 1200 may proceed to a step 1250 of modifying model parameters and subsequently returning to step 1220. In various embodiments, model 1020 may be rated based on the average error generated by model 1020. In various embodiments, a model may be tailored for each vehicle with given vehicle attributes.

Figure 13:
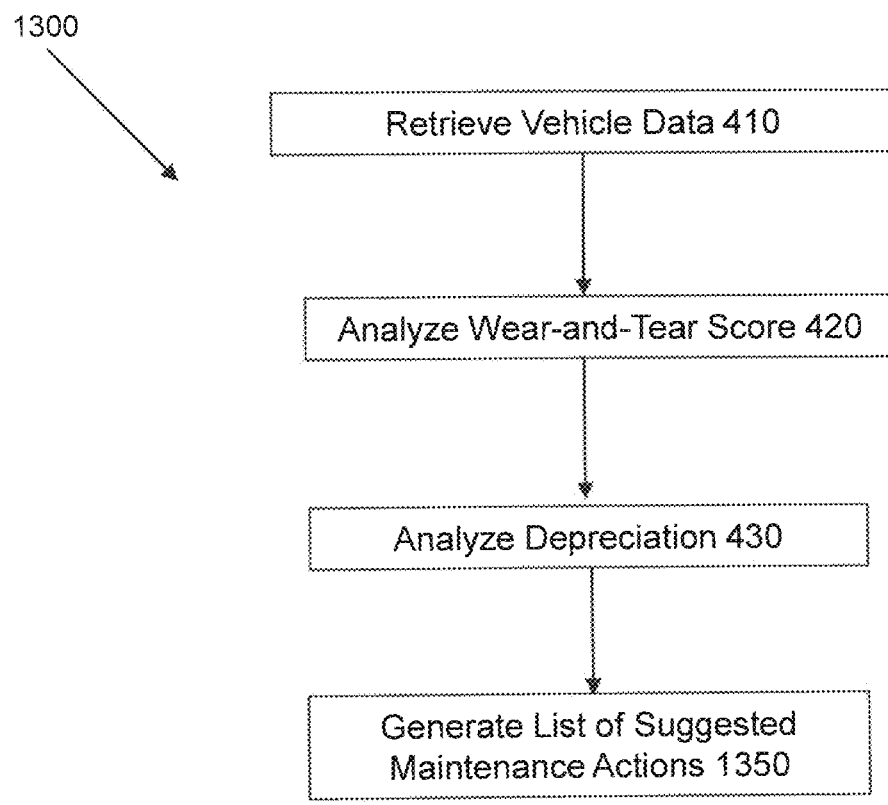
FIG. 13 is a flowchart of an exemplary process of generating a list of actions, consistent with disclosed embodiments.

FIG. 13 shows a process 1300 which may be a variation of process 400 shown in FIG. 4. For example, process 1300 may include steps 410, 420 and 430 of process 400. At a step 1350 of process 1300, a list of suggested maintenance actions may be generated. In some embodiments, the list of suggested maintenance actions may include suggested repairs (e.g., transmission repair, brake replacement, body repair, headlamp replacement, etc.), suggested maintenance (e.g., oil change, transmission fluid change, etc.) suggested cleaning (interior cleaning, seat replacement, carpet cleaning, etc.) with each suggested maintenance action indicating expected decrease in depreciation of a vehicle (i.e., increase in selling price of the vehicle). In various embodiments, suggested maintenance actions may be generated using machine-learning models. For example, a machine-learning model may include a neural network, or the like, and can be trained on data that may include a wear-and-tear score for a vehicle, a predicted depreciation for the vehicle, one or more vehicle maintenance actions, and a corresponding increase in the vehicle price due to execution of one or more of the vehicle maintenance actions.

Figure 14:
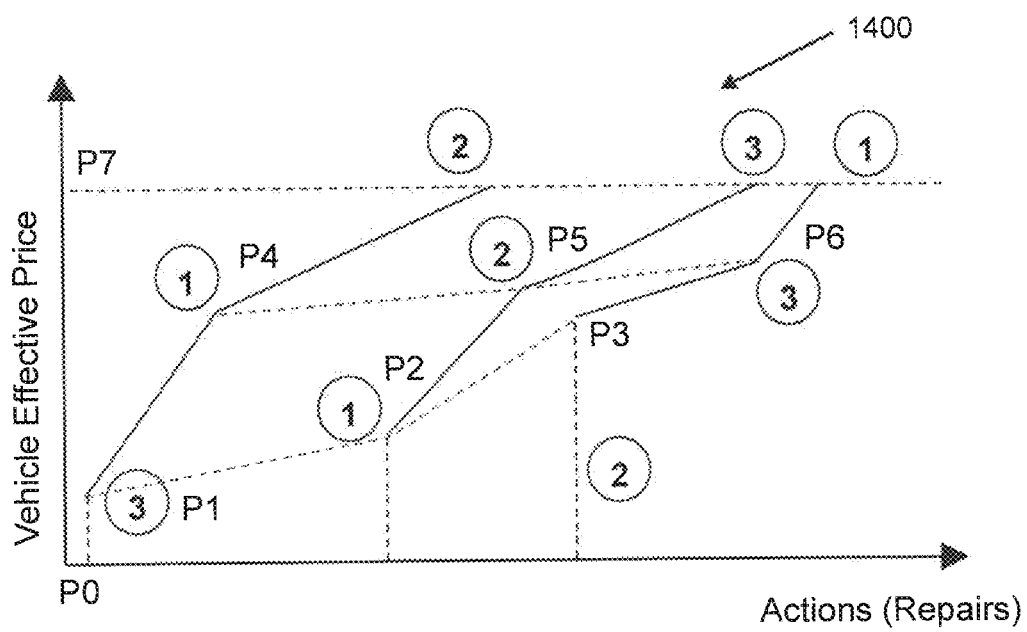
FIG. 14 is a chart of exemplary actions leading to an increase in an effective price of a vehicle, consistent with disclosed embodiments.

FIG. 14 shows an exemplary graph 1400 of representative maintenance actions labeled 1, 2 and 3 and resulting changes in a vehicle effective price due to these actions. The vehicle effective price may be calculated as a difference between the vehicle sales price after the maintenance action and the cost of the corresponding maintenance action. For example, action 3 results in a vehicle effective price increasing from value P0 to value P1, action 1 results in the vehicle effective price increasing from value P0 to value P2, and action 2 results in the vehicle effective price increasing from value P0 to value P3. If only one maintenance action is taken, graph 1400 shows that action 2 is preferred to obtain the highest vehicle effective price. As shown in FIG. 13, when action 3 is followed by action 1 the vehicle may be sold at an effective price of P4, when action 1 is followed by action 2 the vehicle may be sold at an effective price of P5 that, in an illustrative embodiment, may be larger than P4, and when action 2 is followed by action 3 the vehicle may be sold at an effective price of P6 that may be larger than P5 in an illustrative embodiment.

In various embodiments, the order of actions may not be important and result in expected vehicle effective price of P7 when all the maintenance action 1, 2, and 3 are taken. Graph 1300 may be presented to vehicle owner 180 via interface 194 and may allow vehicle owner 180 to quickly overview possible maintenance actions and their associated impact on the vehicle sales price. Graph 1400 shown in FIG. 14 is only illustrative, and maintenance actions may lead to various changes to the vehicle effective price. For example, in some embodiments, the order of actions may be important. For example, the order of actions may be important if the last maintenance action involves cleaning the vehicle. In some embodiments, the effect of maintenance actions may depend on other factors associated with a sale of the vehicle such as the location of the vehicle, vehicle attributes, time of sale of the vehicle, or other external factors such as fashion, weather patterns, gas prices or the like.

Figure 15:
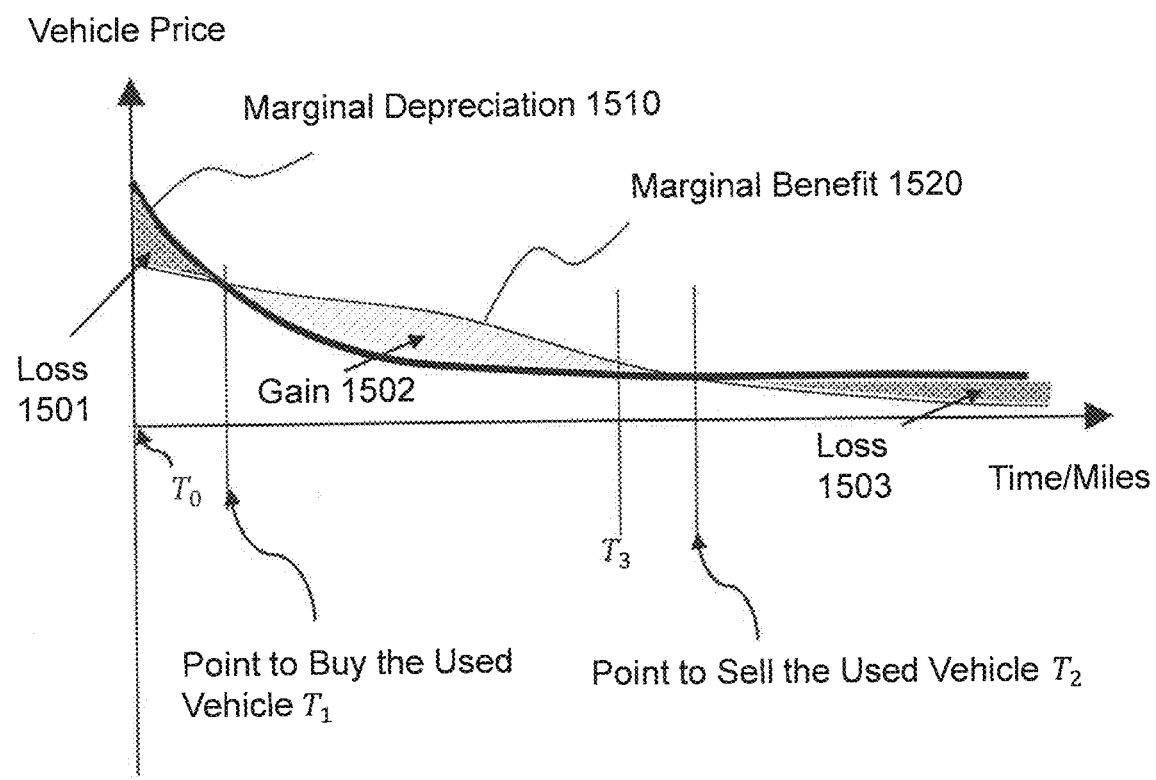
FIG. 15 is a chart of exemplary financial data that can be used to decide when to dispose of a vehicle, consistent with disclosed embodiments.

In various embodiments, vehicle data system 105 may inform vehicle owner 102 when may be the best time to purchase and sell vehicle 103. FIG. 15 shows representative graphs of various financial data including a marginal depreciation 1510, and a marginal benefit 1520. For brevity, graphs of financial data may be referred to as curves 1510, 1520 in subsequent discussion.

As used herein, unless otherwise noted, the term "marginal depreciation" (MD) means vehicle depreciation per unit of time. For example, a daily marginal depreciation is the change in vehicle value from one day to the following day. For example, if a vehicle value is decreased by $10.45 dollars in a day from the value of $26,000 of the previous day than daily marginal depreciation is $10.45. In various embodiments, the term "depreciation" or "overall depreciation" is referred to a difference between the current value of vehicle 103 and the price paid for vehicle 103 by owner 102. In various embodiments, depreciation may be calculated as an area under the curve 1510. Vehicle depreciation during a time between a first and a second time means the loss in value of a vehicle during that time.

As used herein, unless otherwise noted, the term "marginal benefit" (MB) is referred to the amount of money owner 102 is willing to pay per unit of time to own vehicle 103. In various embodiments, the marginal benefit may include losses associated with vehicle repair and maintenance. For example, if owner 102 is willing to pay $25 per unit of time to own vehicle 103 which may require $4 of repairs (on average) per unit of time and $5 of maintenance per unit of time (e.g., cleaning, fees and/or interest), the marginal benefit may be calculated as $25−$4−$5=$16.

It should be understood, that while marginal depreciation may be a well-established quantity, the marginal benefit is a highly subjective quantity. In various embodiments, the marginal benefit may be established by periodically surveying owners 102. In an illustrative embodiment, owners 102 may be asked a set of questions to evaluate the marginal benefit of their vehicles. For example, owners 102 may be asked to enter the amount of money they are willing to pay per unit of time to drive vehicle 103. In some embodiments, owners 102 may be questioned about what vehicles they might be willing to drive. In various embodiments, the term "benefit" or "overall benefit" is referred to benefit received from vehicle 103 during the time owner 102 owned vehicle 103. In various embodiments, the overall benefit may be calculated as an area under the curve 1520. Overall benefit from vehicle 103 during a time between a first and a second time means the overall benefit from vehicle 103 received by owner 103 during that time.

In various embodiments, system 105 may be configured to define social groups for owners 102. In various embodiments, system 105 may receive a variety of personable information from owners 102 and may be configured to determine the social group that may include owner 102. In an illustrative embodiment, owner 102 may provide system 105 information about their marital status, a number of children in a family of the owner, ages of the children, occupation of owner 102, age of owner 102, car preferences for owner 102, and other suitable information that may be used by system 105 to associate owner 102 with a social group. In various embodiments, a representative owner belonging to a social group may have the same preferences for vehicles, and, as a result, may receive the same (or similar) marginal benefit from their vehicles.

FIG. 15 shows that marginal depreciation 1510 may be high for a new vehicle at a time $T_0$, but may decrease for larger times (e.g., at time $T_2$) in accordance with typical vehicle depreciation trends. For example, some vehicles may depreciate as much as 10% as soon as they are used for the first time. In an illustrative embodiment shown in FIG. 15, marginal benefit 1520 enjoyed by owning a vehicle may be steady and high when a vehicle is new (e.g., at time $T_0$ as shown in FIG. 15) but may decrease considerably for an older vehicle (e.g., at time $T_2$, as shown in FIG. 15). The decrease in marginal benefit 1520 is related to overall owner dissatisfaction with the aging vehicle 103 either because of various defects incurred by the vehicle 103 throughout ownership time, or the availability of newer, more attractive vehicles. In some cases, financially burdensome increasing maintenance costs for older vehicle 103 may decrease marginal benefit from vehicle 103. In various embodiments, marginal benefit 1520 obtained from vehicle 103 may include various losses associated with owning or leasing vehicle 103 (e.g., costs associated with parking vehicle 103, as well as taxes and interest paid by owner, toll fees, gas fees, etc.)

For brevity of discussion, FIG. 15 uses time as a parameter for plotting marginal data, such as curves 1510 and 1520, with the understanding that miles driven by vehicle 103 may be used in a similar way. For the purposes of this discussion, all the elements, concepts and notation related to time may be equally applied to miles driven by vehicle 103.

FIG. 15 shows a loss region 1501 that may be calculated as a difference between marginal benefit curve 1520 and marginal depreciation curve 1510. In various embodiments, a loss is characterized by a negative number. For example, for vehicle 103 with the marginal benefit of $30 per day (i.e., user is willing to pay $30 per day to drive vehicle 103) and the marginal depreciation of $500 a day (marginal depreciation may be very high for new vehicles), the loss may be $30−$500=−$470. In various embodiments, loss 1501 associated with large marginal depreciation 1510 may be avoided by buying a used vehicle at a time $T_1$ when curve 1510 intersects curve 1520.

When marginal benefit 1520 is higher than marginal depreciation 1510, owner 102 may experience gain 1502. After a time $T_2$, when curve 1510 intersects curve 1520, marginal depreciation 1510 becomes higher than marginal benefit 1520 and owner 102 may experience overall loss 1503. In order to avoid loss 1503, owner 102 may sell vehicle 103 at time $T_2$. In various embodiments, owner 102 may place vehicle 103 for sale prior to time $T_2$ in order to account for the time needed to sell the vehicle. In an example embodiment, system 105 may recommend owner 102 to sell vehicle 103 at a time $T_3$ that is prior and in the proximity of time $T_2$. In an example embodiment, time $T_3$ may be determined when the difference between curve 1520 and curve 1510 is below a target value selected by system 105 and when the difference is decreasing.

In various embodiments, system 105 may display curves 1510 and 1520 for owner 102 at past, current and future times. For example, system 105 may extrapolate marginal depreciation curve 1510 for future times based on known current and past data for vehicle 103, as well as data for vehicles with the same vehicle attributes stored in database 120 of system 105. Similarly, system 105 may extrapolate marginal benefit curve 1520 based on various known trends in the marginal benefit for owners 102.

Figure 16:
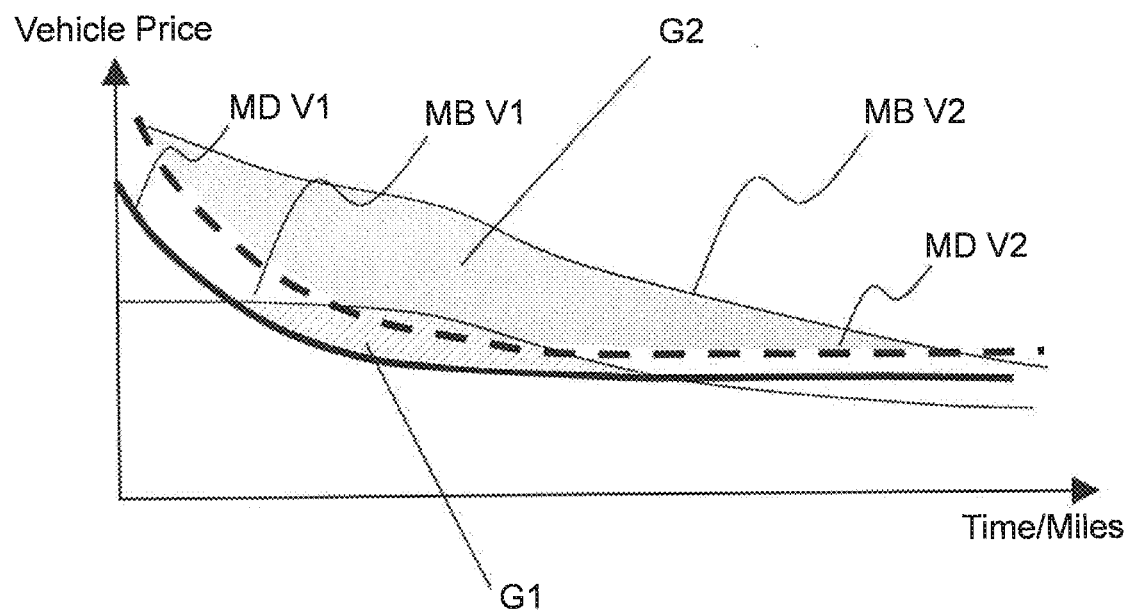
FIG. 16 is a chart of exemplary financial data that can be used to decide when to dispose of a vehicle, consistent with disclosed embodiments.

Curves 1510 and 1520 may be one example of marginal depreciation and marginal benefit. FIG. 16 illustrates similar curves for two different vehicles. For example, curve labeled MD V1 may correspond to a marginal depreciation of a first vehicle, curve labeled MD V2 may correspond to a marginal depreciation of a second vehicle, curve MB V1 may correspond to a marginal benefit of a first vehicle, and curve MB V2 may correspond to a marginal benefit of a second vehicle. In various embodiments, area labeled G1 may correspond to gain to owner 102 from having the first vehicle and area labeled G2 may correspond to gain to owner 102 from having the second vehicle. FIG. 16 shows that while the second vehicle may have a higher overall price and higher initial depreciation rates, gain G2 is higher than gain G1 due to marginal benefit of choosing a second vehicle over a first vehicle. In an illustrated embodiment, the first vehicle may be a family sedan with basic features, while the second vehicle may be a fine sports car with a powerful engine and refined trim line. For a young owner 102, the second car may offer substantially more benefit in spite of the second car's higher upfront cost, higher maintenance cost, and higher depreciation rates.

Figure 17:
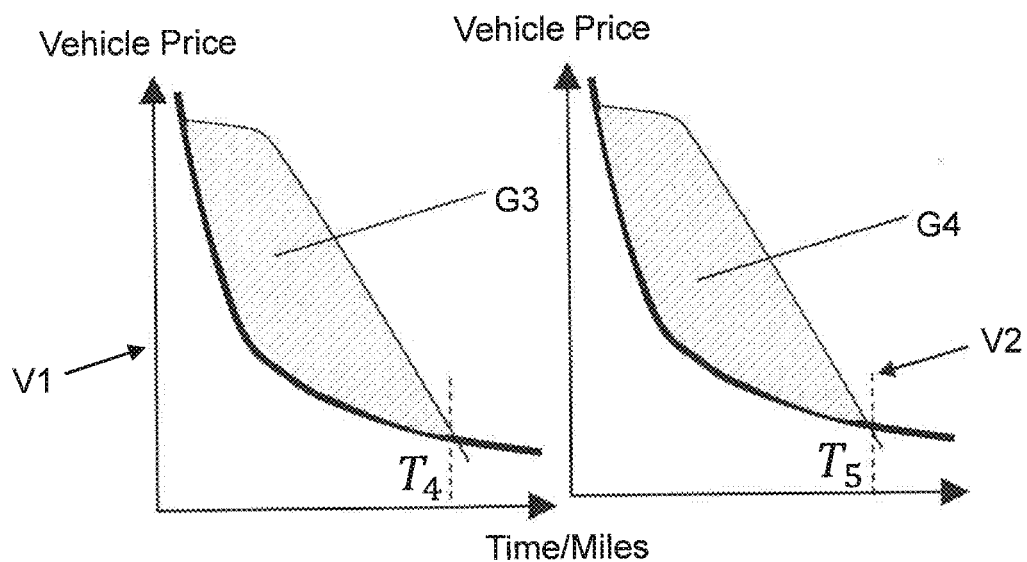
FIG. 17 is a chart of exemplary financial data that can be used to decide when to dispose of a vehicle, consistent with disclosed embodiments.

In various embodiments, system 105 may suggest options to owner 102 based on owner preferences. In some embodiments, for example, system 105 may present owner 102 with marginal depreciation and marginal benefit curves for various vehicles via interface system 150. For example, charts depicted in FIGS. 15-16 may be plotted for the owner 102 using interface system 150. In various embodiments, charts displayed by interface system 150 may allow owner 102 to select the best vehicle option as well as the best times to buy and sell vehicle 103. In some embodiments, system 105 may suggest owner 102 to consider owning vehicle 103 for a selected period of time when owner 102 may be experiencing gain from owning vehicle 103. For example, FIG. 17 shows a gain G3 for a vehicle V1 and a gain G4 for a vehicle V2. Owner 102 may first own vehicle V1 for a time $T_4$ and then vehicle V2 for a time $T_5$ resulting in overall benefits higher that might have been obtained from owning one car for a time $T_6$ than may be longer than time $T_4$ or time $T_5$ (for example, time $T_6$ may be comparable to $T_4+T_5$).

Figure 18:
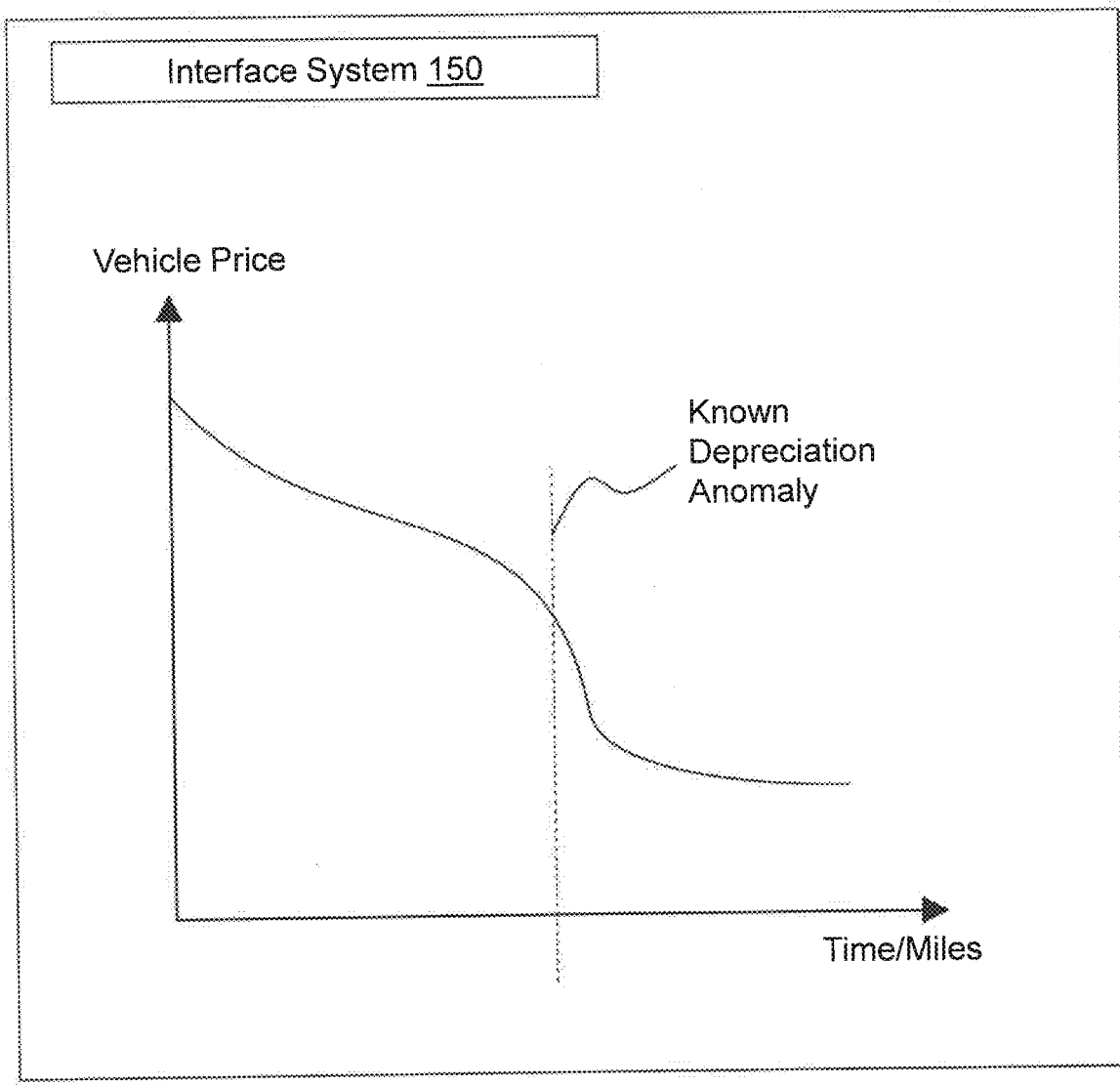
FIG. 18 is a graph of an exemplary change in vehicle price as a function of vehicle age or miles traveled by a vehicle, consistent with disclosed embodiments.

While FIGS. 15-17 demonstrate one approach for estimating the time (or miles traveled by a vehicle) for selling the vehicle, various other approaches may be used as well. For example, as shown in FIG. 18 the disposal time may be influenced by a significant change in depreciation for the vehicle that may be based on historical data. In an illustrative embodiment, the vehicle may be disposed of or repaired if a change in vehicle depreciation is predicted. For example, a significant change in depreciation may be predicted based on previously known depreciation trends for vehicle 103. In an example embodiment, vehicle 103 may be known to have mechanical problems that manifest themselves for vehicles that are older than a threshold age or have a millage above a threshold value.

In various embodiments, a statistical approach may be used to determine when to dispose of vehicle 103 using only depreciation data for various vehicles with the same vehicle attributes (i.e., vehicle year, make, model, mileage and trim line). FIG. 19 shows an illustrative embodiment, of distributions 1901 and 1902 of a number of cars sold as a function of time (age of vehicle 103) or mileage traveled by vehicle 103. In various embodiments, distributions 1901 and 1902 may be evaluated for non-owned vehicles that have the same vehicle attributes as vehicle 103 owned by owner 102. In some embodiments, distribution 1902 may correspond to the non-owned vehicles with low wear-and-tear score, and distribution 1901 may correspond to the non-owned vehicles with high wear-and-tear score. For example, low wear-and-tear score may be in the bottom ten percent range of wear-and-tear scores recorded by system 105, and high wear-and-tear score may be in the top ten percent range of wear-and-tear scores. It should be noted that specific numbers describing low and high wear-and-tear scores are only illustrative and any other numbers may be chosen as convenient. For example, curves 1901 and 1902 may shift and change shape depending on corresponding wear-and-tear score related to these curves.

In various embodiments, curves 1901 and 1902 may exhibit maximum at times $T_{s1}$ and $T_{s2}$ indicating the best times to sell a vehicle with a corresponding wear-and-tear score. In various embodiments, system 105 may plot wear-and-tear score for owner 102 as a function of time. In an illustrated embodiment shown in FIG. 19, owner 102 may have a wear-and-tear score 1925 that is somewhere between a maximum wear-and-tear score 1922 and a minimum wear-and-tear score 1921, where wear-and-tear scores 1921, 1922, and 1925 are plotted as a function of time. In an illustrative embodiment, since wear-and-tear score 1925 is somewhere between wear-and-tear score 1921 and 1922, it may be best to sell vehicle 103 at a time $T_s$ that may be between $T_{s1}$ and $T_{s2}$.

In an illustrative embodiment, if the difference between wear-and-tear score 1925 and maximum wear-and-tear score 1922 is $R_2$ and the difference between wear-and-tear score 1925 and minimum wear-and-tear score 1921 is $R_1$, then time for selling vehicle 103 may be evaluated as $T_s = T_{s1} + [R_2/(R_1+R_2)](T_{s2}-T_{s1})$. For example, for wear-and-tear score 1925 matching low wear-and-tear score 1921, $R_1=0$, and $T_s=T_{s2}$. Alternatively, for wear-and-tear score 1925 matching high wear-and-tear score 1922, $R_2=0$, and $T_s=T_{s1}$. It should be noted that expression for $T_s$ corresponds to a linear interpolation based on values of $R_1$ and $R_2$ at time $T_{s1}$. In various embodiments, values of $R_1$ and $R_2$ may change as a function of time, and other expressions may be used to obtain an appropriate prediction for selling vehicle 103.

Figure 20:
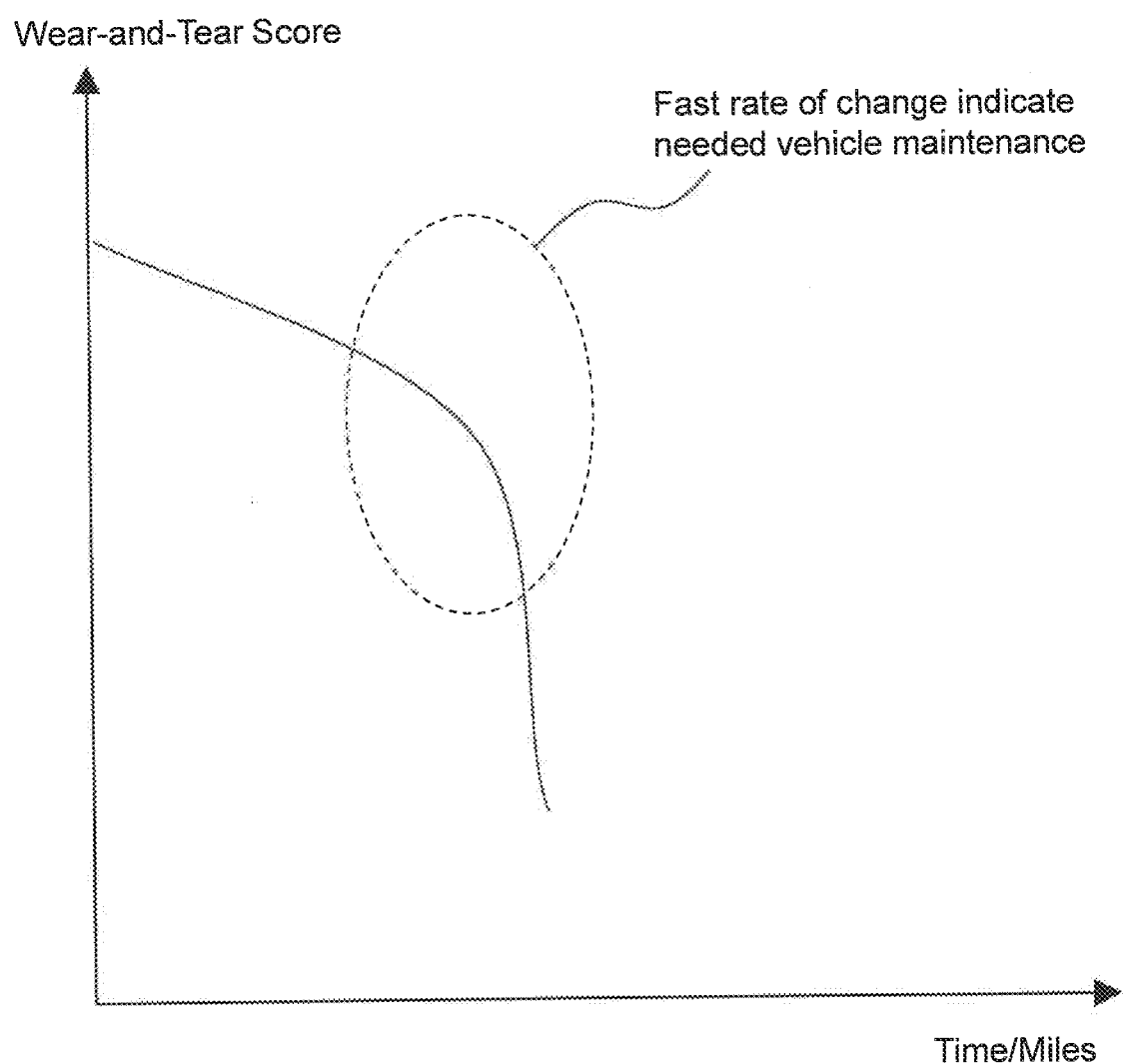
FIG. 20 is a graph of an exemplary change in wear-and-tear score of a vehicle as a function of vehicle age or miles traveled by a vehicle, consistent with disclosed embodiments.

In various embodiments, vehicle owner 102 may monitor a wear-and-tear score for the vehicle via interface 130. In some embodiment, vehicle owner 102 may monitor a comprehensive (single) wear and tear score, and in some embodiments, vehicle owner 102 may monitor a wear and tear score associated with individual components of the vehicle. In some embodiments, system 105 may be configured to inform vehicle owner 102 about rapid changes in the wear and tear score that may indicate that the vehicle needs to be disposed of or repaired. For example, the wear and tear score may be plotted as a function of time as shown in FIG. 20, indicating a vehicle failure. In some embodiments, the rate of change of comprehensive or individual wear and tear score above a threshold value may result in system 105 issuing a notification to vehicle owner 102. In various embodiments, threshold values may be determined based on a historical correlation between various wear and tear scores and various vehicle failures associated with those scores.

In various embodiments, various financial data may be used by vehicle system 105 for obtaining a recommendation for vehicle disposal for vehicle owner 102. In an illustrative embodiment, vehicle depreciation may be used, and additionally or alternatively, vehicle marginal depreciation may be used as described above. In various embodiments, vehicle depreciation or vehicle marginal depreciation may be a part of depreciation data obtained by vehicle owner system, and various elements of this depreciation data may be used for predicting the best time for vehicle disposal.

In various embodiments, an overall benefit generated by a vehicle may be used, and additionally or alternatively, vehicle marginal benefit may be used as described above. In various embodiments, vehicle overall benefit or vehicle marginal benefit may be a part of benefit data obtained by system 105, and various elements of this benefit data may be used for predicting the best time for vehicle disposal. In various embodiments, a gain from a vehicle may include a difference between overall benefit generated by a vehicle and overall vehicle depreciation. In various embodiments, the negative gain may be referred to as loss.

The foregoing description has been presented for purposes of illustration. It is not exhaustive and is not limited to precise forms or embodiments disclosed. Modifications and adaptations of the embodiments will be apparent from a consideration of the specification and practice of the disclosed embodiments. For example, while certain components have been described as being coupled to one another, such components may be integrated with one another or distributed in any suitable fashion.

Moreover, while illustrative embodiments have been described herein, the scope includes any and all embodiments having equivalent elements, modifications, omissions, combinations (e.g., of aspects across various embodiments), adaptations and/or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods can be modified in any manner, including reordering steps and/or inserting or deleting steps.

The features and advantages of the disclosure are apparent from the detailed specification, and thus, it is intended that the appended claims cover all systems and methods falling within the true spirit and scope of the disclosure. As used herein, the indefinite articles "a" and "an" mean "one or more." Similarly, the use of a plural term does not necessarily denote a plurality unless it is unambiguous in the given context. Words such as "and" or "or" mean "and/or" unless specifically directed otherwise. Further, since numerous modifications and variations will readily occur from studying the present disclosure, it is not desired to limit the disclosure to the exact construction and operation illustrated and described, and accordingly, all suitable modifications and equivalents may be resorted to, falling within the scope of the disclosure.

Other embodiments will be apparent from a consideration of the specification and practice of the embodiments disclosed herein. It is intended that the specification and examples be considered as an example only, with a true scope and spirit of the disclosed embodiments being indicated by the following claims.

What is claimed is:

1. A system for providing a maintenance recommendation for an owned vehicle, the system comprising one or more memory devices storing instructions and one or more processors configured to execute the instructions to perform operations comprising:
   generating a profile for the owned vehicle, the profile comprising an age, mileage, and location of the owned vehicle;
   receiving monitoring data of the owned vehicle, the monitoring data being collected by sensors and comprising at least one of acceleration data, onboard diagnostics data, a history of location data for the owned vehicle, a history of weather data, a speed, or a repair data for the owned vehicle;
   receiving disposal data for non-owned vehicles corresponding to the profile;
   generating a wear-and-tear score for the owned vehicle based on the monitoring data using a computerized statistical approach; and
   generating, using a machine-learning model trained on recorded data related to at least one of a mileage, wear-and-tear score, or repairs associated with a vehicle, suggested maintenance actions for the owned vehicle, based on the received disposal data for the non-owned vehicles, the wear-and-tear scores for the non-owned vehicles, and the wear-and-tear score for the owned vehicle.

2. The system of claim 1, wherein the operations further comprise receiving depreciation data for the non-owned vehicles.

3. The system of claim 1, wherein the suggested maintenance actions include suggested repairs, suggested maintenance, and suggested cleaning actions.

4. The system of claim 1, wherein the suggested maintenance actions correspond to an expected decrease in depreciation of the owned vehicle.

5. The system of claim 1, wherein the suggested maintenance actions may be generated using a neural network.

6. The system of claim 5, where the neural network is trained on data that includes the wear-and-tear score for the vehicle, a predicted depreciation for the vehicle, one or more vehicle maintenance actions, and a corresponding increase in the vehicle price based on execution of one or more of the suggested maintenance actions.

7. The system of claim 1, wherein generating suggested maintenance actions comprises presenting a graph of one or more suggested maintenance actions and presenting resulting changes in a vehicle effective price due to the suggested maintenance actions.

8. The system of claim 7, wherein the vehicle effective price is calculated as the difference between a vehicle sales price after the suggested maintenance action and a cost of the suggested maintenance action.

9. The system of claim 7, wherein the graph states an order of actions for the suggested maintenance actions.

10. The system of claim 1, wherein the suggested maintenance actions depend on a location of the vehicle, vehicle attributes, or a time of sale of the vehicle.

11. The system of claim 1, wherein the monitoring data comprises a history of weather data corresponding to the history of the location data for the owned vehicle.

12. The system of claim 1, wherein the wear-and-tear score is calculated based on the vehicle monitoring data, vehicle age, vehicle mileage, and vehicle repairs.

13. The system of claim 1, wherein the repair data comprises a type of a repair, a labor cost of the repair, and a parts cost of the repair.

14. The system of claim 1, wherein the computerized statistical approach includes a linear regression.

15. A method for providing a maintenance recommendation for an owned vehicle, the method comprising:
   generating a profile for the owned vehicle, the profile comprising an age, mileage, and location of the owned vehicle;
   receiving monitoring data of the owned vehicle, the monitoring data being collected by sensors and comprising at least one of acceleration data, onboard diagnostics data, a history of location data for the owned vehicle, a history of weather data, a speed, or a repair data for the owned vehicle;
   receiving disposal data for non-owned vehicles corresponding to the profile;
   generating a wear-and-tear score for the owned vehicle based on the monitoring data using a computerized statistical approach; and
   generating, using a machine-learning model trained on recorded data related to at least one of a mileage, wear-and-tear score, or repairs associated with a vehicle, suggested maintenance actions for the owned vehicle, based on the received disposal data for the non-owned vehicles, the wear-and-tear scores for the non-owned vehicles, and the wear-and-tear score for the owned vehicle.

16. The method of claim 15, wherein providing suggested maintenance action comprises presenting a graph of one or more suggested maintenance actions and presenting resulting changes in a vehicle effective price due to the suggested maintenance actions.

17. The method of claim 16, wherein the vehicle effective price is calculated as the difference between a vehicle sales price after the maintenance action and a cost of the suggested maintenance action.

18. The method of claim 16, wherein the maintenance graph states an order of actions for the suggested maintenance actions.

19. The method of claim 15, wherein the suggested maintenance actions depend on a location of the vehicle, vehicle attributes, or a time of sale of the vehicle.

20. A non-transitory computer-readable medium storing instructions which, when executed, cause at least one processor to perform operations for providing a maintenance recommendation for an owned vehicle, the operations comprising:

generating a profile for the owned vehicle, the profile comprising an age, mileage, and location of the owned vehicle;

receiving monitoring data of the owned vehicle, the monitoring data being collected by sensors and comprising at least one of acceleration data, onboard diagnostics data, a history of location data for the owned vehicle, a history of weather data, a speed, or a repair data for the owned vehicle;

receiving disposal data for non-owned vehicles corresponding to the profile;

generating a wear-and-tear score for the owned vehicle based on the monitoring data using a computerized statistical approach; and generating, using a machine-learning model trained on recorded data related to at least one of a mileage, wear-and-tear score, or repairs associated with a vehicle, suggested maintenance actions for the owned vehicle, based on the received disposal data for the non-owned vehicles, the wear-and-tear scores for the non-owned vehicles, and the wear-and-tear score for the owned vehicle.

\* \* \* \* \*